US008713437B2

(12) United States Patent (10) Patent No.: US 8,713,437 B2
Burke et al. (45) Date of Patent: Apr. 29, 2014

(54) SYSTEM AND METHOD FOR PROVIDING DYNAMIC NAVIGATION THROUGH A PROPERTY TO A SELECTED DESTINATION

(75) Inventors: Michael J. Burke, Las Vegas, NV (US); George J. Levine, Las Vegas, NV (US)

(73) Assignee: Michael Burke, Las Vegas, NV (US)

( * ) Notice: Subject to any disclaimer, the term of this patent is extended or adjusted under 35 U.S.C. 154(b) by 1116 days.

(21) Appl. No.: 12/272,644

(22) Filed: Nov. 17, 2008

(65) Prior Publication Data

US 2010/0125789 A1 May 20, 2010

(51) Int. Cl.
*G06F 3/048* (2013.01)
(52) U.S. Cl.
USPC ............................ 715/706; 715/817; 715/818
(58) Field of Classification Search
USPC .......................................... 715/706, 817, 818
See application file for complete search history.

(56) References Cited

U.S. PATENT DOCUMENTS

| | | | | |
|---|---|---|---|---|
| 6,144,318 | A * | 11/2000 | Hayashi et al. | 340/995.19 |
| 7,587,274 | B2 * | 9/2009 | Kaldewey et al. | 701/208 |
| 7,737,861 | B2 * | 6/2010 | Lea et al. | 340/8.1 |
| 8,174,499 | B2 * | 5/2012 | Yoshida | 345/157 |
| 2002/0078459 | A1 * | 6/2002 | McKay | 725/78 |
| 2003/0032479 | A1 * | 2/2003 | LeMay et al. | 463/32 |
| 2003/0064705 | A1 * | 4/2003 | Desiderio | 455/412 |
| 2004/0169589 | A1 * | 9/2004 | Lea et al. | 340/825.49 |
| 2005/0033511 | A1 * | 2/2005 | Pechatnikov et al. | 701/210 |
| 2009/0037834 | A1 * | 2/2009 | Parrish | 715/771 |
| 2009/0292465 | A1 * | 11/2009 | Kaldewey et al. | 701/209 |
| 2010/0008337 | A1 * | 1/2010 | Bajko | 370/338 |
| 2010/0113161 | A1 * | 5/2010 | Walker et al. | 463/42 |
| 2010/0125789 | A1 * | 5/2010 | Burke et al. | 715/706 |

OTHER PUBLICATIONS

Las Vegas Casino Property Maps and Floor Plans, URL http://www.vegascasinoinfo.com/propmap1.html, 2 pages, and sample map of Bally's, 1 page, printed Jun. 15, 2009.

* cited by examiner

*Primary Examiner* — David Phantana Angkool

(57) ABSTRACT

A system and method for providing navigation for visitors to casinos allows the visitors to select a game, amenity, attraction, or facility as a desired destination, and then have a route provided them to that destination. The route can be drawn on a touch screen display. As an avatar proceeds along the route, it passes landmarks that are highlighted through animation. They may grow as the avatar approaches, then shrink back as it continues beyond the landmark. This is typically repeated several times, allowing the customer to easily remember the series of landmarks, and, thus, the route to the desired destination. He can then follow the route by moving from landmark to landmark across the casino floor. A customized map with the route may also be printed.

19 Claims, 34 Drawing Sheets

FIG. 15

Touch N' Go

Mardi Gras Room
The Hotel and Casino's largest function space, the Mardi Gras Room can be split in half or used as a whole with a capacity of 2,500 guests when set up reception-style.

Esplanade Room
An attractive meeting room that will accommodate anything from a 50-guest conference to a cocktail party of 700. The room can be used as a whole or divided into four separate rooms.

Bienville Room
Suitable for a wide range of functions, this room can be divided into up to three separate rooms or used as a whole with a capacity of 504 guests.

Dauphine Room
This room is a large, elegant space that can be divided into up to six separate rooms or used as a whole with a capacity of 450 guest when set up reception style.

Additional Rooms
Perfect for a wide range of events, the Board Room can be used as a whole or divided into separate rooms depending on specific needs and can accommodate up to 112 people.

Stardust Suite
Whether holding a meeting, conference, or special event such as a birthday or bachelor party, this suite is the answer to your needs, offering 2500 sq. feet of comfort and style.

Slots  Table Games  Progressives  Jackpot Winners  Restaurants  Shopping  Entertainment  Conventions  Hotel Services  Bars  Video Poker  What's New

SYSTEM AND METHOD FOR PROVIDING DYNAMIC NAVIGATION THROUGH A PROPERTY TO A SELECTED DESTINATION

FIELD OF THE INVENTION

The present invention generally relates to computer aided navigation, and, more specifically, to a system and method for providing dynamic navigation through a large facility such as a casino to a selected destination.

BACKGROUND OF THE INVENTION

Casinos today are being built with ever larger gaming spaces and extra amenities. 150,000 square feet of gaming space is no longer uncommon. In this space, there may be thousands of slot and video gaming machines, providing hundreds of different games at denominations ranging from pennies to hundreds of dollars or higher. Pits of non-slot machine games, such as table games, roulette, craps, etc. are typically interspersed within the long rows of slot machines. Surrounding the games are often entertainment, shopping, hotels, and conventions. Indeed, the larger casinos tend to have some of the best headliner entertainment available in the country, with many of the biggest names in entertainment doing shows. Also, within and around the gaming areas are the facilities and amenities that make a casino work, including bars, restaurants, restrooms, cashier's cages, ticket redemption centers, frequent player's clubs, etc. The entire casino is typically well integrated to maximize revenue through impulse buying and synergy.

One problem that has arisen as casinos get bigger and bigger, is that it is becoming ever harder for people to find what they want in a casino, and in particular, on the gaming floor. With thousands of slot or video gaming machines flashing their lights and making seductive noises, it has become ever more difficult to find a specific game, especially if a player wants to play it with specific stakes. Similarly, the larger casinos may offer dozens of table games at various denominations in multiple pits, typically surrounded by those blinking and clanging slot machines. Even finding restrooms can be difficult.

Making things even more difficult, the trend is towards a more dynamic gaming floor. Table games open and close, depending on traffic. The table stakes and bets also may change during the day, again depending on traffic. A player may have found a game to his liking in one pit one day, and the next time he visits, that table is closed, but the same game is being played across the casino. This trend is extending into slot machines, with some slot machines being capable of dynamically changing the games and/or their wagering denomination.

Currently, the larger casinos provide static maps of their properties, similar to those found at many shopping centers. They typically show the major facilities, such as restaurants, meeting rooms, hotel, stores, restrooms, etc. But invariably, the gaming floor is shown as a big open space, often identified just as "gaming". These maps are even available online. For example, http://www.lvcasinoinfo.com/propmap1.html currently provides links to maps for most of the casinos in Las Vegas.

It would be advantageous for casinos to be able to provide their visitors with a fast, efficient, method of finding whatever they want to see or experience, while visiting. In particular, it would be advantageous if they could provide such a fast, efficient, method for their visitors to find the slot machine games, table games, and other facilities and amenities they may be interested in seeing or experiencing.

BRIEF SUMMARY OF THE INVENTION

A system and method for providing navigation for visitors to casinos allows the visitors to select a game, amenity, attraction, or facility as a desired destination, and then have a route provided them to that destination. The route can be drawn on a touch screen display. As an avatar proceeds along the route, it passes landmarks that are highlighted through animation. They may grow as the avatar approaches, then shrink back as it continues beyond the landmark. This is typically repeated several times, allowing the customer to easily remember the series of landmarks, and, thus, the route to the desired destination. He can then follow the route by moving from landmark to landmark across the casino floor. A customized map with the route may also be printed.

BRIEF DESCRIPTION OF THE DRAWINGS

FIG. 15 is drawing showing an exemplary What's New screen, in accordance with one embodiment of the present invention;

FIG. 18 is drawing showing an exemplary Meetings screen, in accordance with one embodiment of the present invention;

FIG. 22 is a drawing showing an exemplary Console Master restaurant description screen, in accordance with one embodiment of the present invention;

FIG. 26 is a drawing showing an exemplary Console Master Jackpot Winners screen, in accordance with one embodiment of the present invention;

DETAILED DESCRIPTION OF THE INVENTION

A system and method is disclosed for providing visitors with routes through a property such as a casino to their selected destinations. The destinations may be banks of slot or video gaming machines providing a specific game, or offering specific denominations of wagering. The destinations may also be specific table games, restaurants, bars, stores, entertainment venues, and other facilities and amenities. The visitor may make his selection of where he wants to go using a touch screen display device, a mobile device, a computer, or other medium providing similar functionality. A route is then drawn on a floor map from a "You are Here" starting location to the selected destination. An avatar then follows the route, passing landmarks as it proceeds along the route. As a landmark is passed, it is animated. It may grow as the avatar approaches, then shrink as the avatar continues beyond it to the next landmark. This is then typically repeated several times. This allows the customer to quickly memorize the route based on the landmarks, and then find his selected destination by moving from landmark to landmark across the casino floor.

The visitor may be allowed to change his starting location, and may also be allowed to dynamically select a different destination, when multiple destinations are available meeting his requirements. A printer may be provided for printing a map to the selected destination, and the map may contain coupons for game play or other amenities, such as food or beverages. The coupons may be printed on the front of the map, or may be printed on the back. This functionality may also be provided over the Internet or on mobile devices, such as smart phones. Furthermore, the selection of the destination may be done utilizing voice recognition, and the route may be provided the visitor using voice technology. Visitors may also be provided additional information about selected destinations, such as restaurants, bars, shows, meetings, and amenities, through the same system and methodology.

While the present invention is disclosed as a casino navigation tool, it should be understood that it is not limited to that venue. Rather, this is exemplary, and other venues and facilities are also within the scope of the present invention, including airports, shopping malls, sports arenas, amusement parks, museums, and big box stores such as Home Depot, Lowes, and Wal-Mart.

Figure 1:
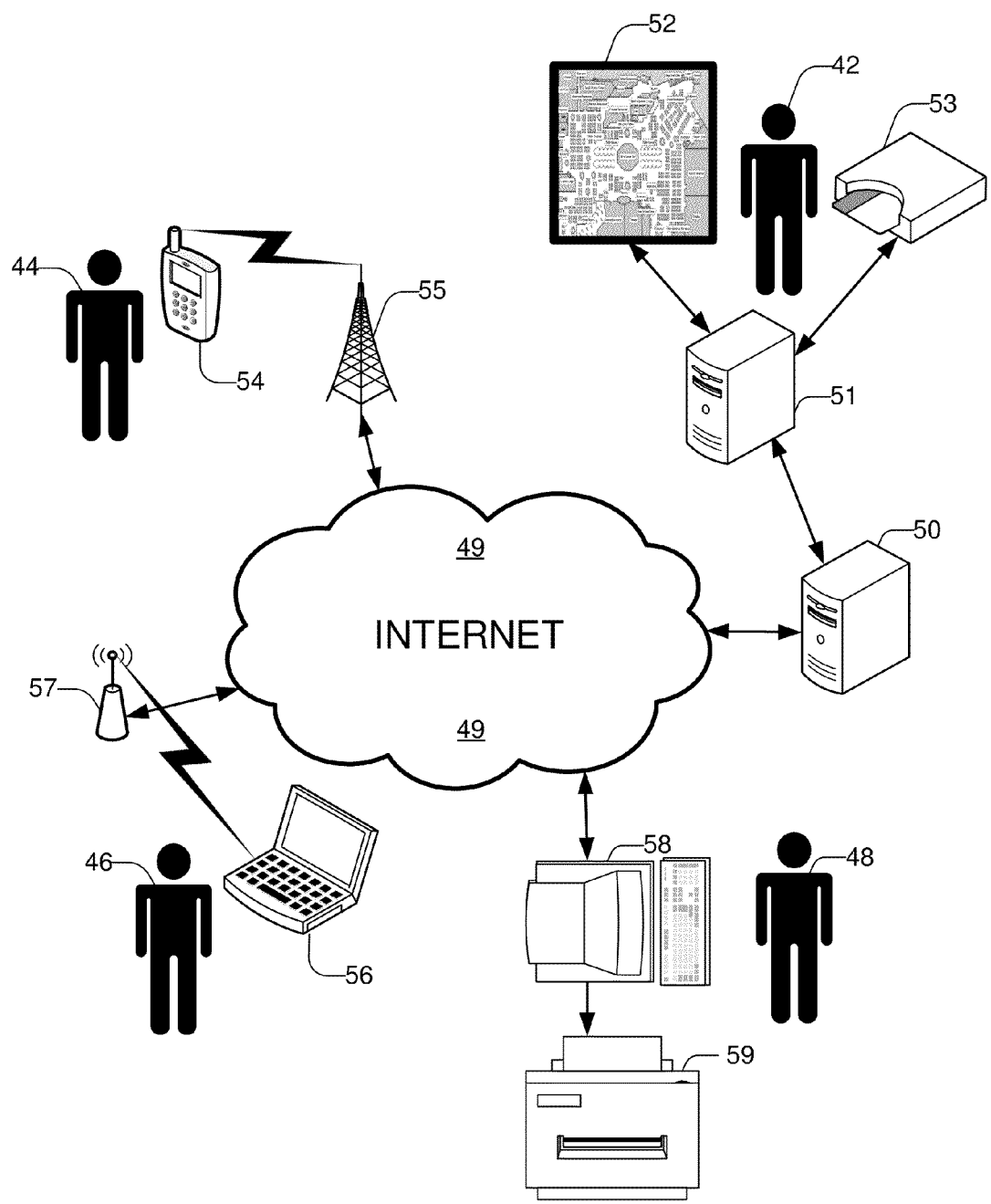
FIG. 1 is a block diagram that illustrates physical components of one embodiment of the present invention.

FIG. 1 is a block diagram that illustrates physical components of one embodiment of the present invention. A navigational server 50 is coupled to a network 49, such as the Internet. This server 50 provides navigational information and generates display screens containing navigational information, for users 42, 44, 46, 48. In one embodiment, navigational aids are provided through a touch screen device 52, which may be located throughout a venue such as a casino or a shopping center. The touch screen device 52 may be coupled to a local server 51 which is coupled to the navigational server 50, or may be coupled to the navigational server 50 without the need for a local server 51. The second server 51 may be utilized to offload handling the touch screen device 52 and other attached devices. A magnetic or smart card reader 53 may also be coupled to the second server 51. A printer 59 may also be attached to the local server 51 for printing maps, coupons, and other navigational information. In one embodiment, the touch screen device 52 is located in an information or electronic kiosk. In a casino environment, there may be such a kiosk near entrances, as well as distributed throughout the casino.

When a user 42 walks up to the touch screen device 52, he can press soft buttons on the screen in order to request navigational and other informational aid for accessing the venue he is visiting. For example, he could press a button requesting Slot Machine information, and from the screen presented, select a slot machine game to play. He could then be shown a map showing the navigation required to reach slot machines providing the requested game. FIGS. 2 through 18 illustrate some of the navigational aids provided by the present invention. The card reader 53 can be utilized by the user 42 to identify himself to the system through his player's card or other identification. Currently, most casinos in the U.S. provide magnetic cards for their frequent players. Some are starting to issue smart cards, smart chips, or RF ids instead. Other technologies for identifying users and players are also within the scope of the present invention. Once a user 42 has been identified, the display of information on the touch screen device 52 can be tailored to his needs. For example, his favorite slot machine or card game could be highlighted. Also, the presentation language can be tailored to his needs. Thus, one user 42 could receive navigational aid in his native English, while another in his native Chinese. Other displays and pointing or selection devices than a touch screen device 52 are also within the scope of the present invention. For example, a non-interactive screen with a mouse, other pointing device, or even a keyboard may be utilized. The navigational system may also be voice actuated.

A user 44 may also communicate with and receive navigational aid through a smart phone 54, such as a Blackberry or iPhone. The smart phone 54 would typically communicate through cellular radio with a cellular transmitter 54 which is coupled to a network, such as the Internet 49, and thence to the navigational server 50. Smart Phones 54 are currently typically GPS enabled, and the GPS location of the smart phone 54, and thus the user 44 requesting navigational aid, may be utilized as a "You Are Here" location for navigational aid. He may also utilize other starting locations, such as one of the entrances to the venue. The smart phone 54 can be utilized to select what navigational aid is requested, through selection of buttons, use of selection keys, voice prompts and/or voice recognition, or through other means inherent to the smart phones 54. The navigational aid may be provided on a smart phone 54 screen, through voice instructions, or by other means inherent to the smart phones 54.

A user 46 may also communicate with and receive navigational aid through a laptop 56 computer coupled 57 to the Internet 49 through, for example, WiFi, WiMax, GSM, or by other means inherent in laptop computers 56. The alternatives for selecting the requested navigational aid are similar to those listed above for smart phones 54, and the alternatives for receiving the navigational aid are also similar to those listed above for smart phones 54.

A user 48 may also communicate with and receive navigational aid through a personal computer 58. The personal computer 58 is typically coupled to the network 49 through a high speed medium, such as Ethernet, but may alternatively couple utilizing wireless means such as WiFi or WiMax. This example was shown separately from the laptop 56 example, because a printer 59 is shown attached to the personal computer 58. The printer can be utilized to print maps generated by the navigational server. The map would typically show a route from a specific entrance to the venue to a desired attraction, such as a specific game in a casino. Coupons may also be printed, either separately, or in conjunction with a map. Maps may be printed on one side, while coupons are printed on the reverse side of the map. The coupons can be tailored to the navigational aid being requested by the user 48 and/or to his identity and past preferences, if he has identified himself, through, for example, signing on to the navigational server 50. Coupons may also relate to the landmarks on a route. For example, the landmark emphasized in FIG. 7C is a Starbucks. A Starbucks coupon could be printed for the route shown in FIGS. 7A-7C.

Figure 2:
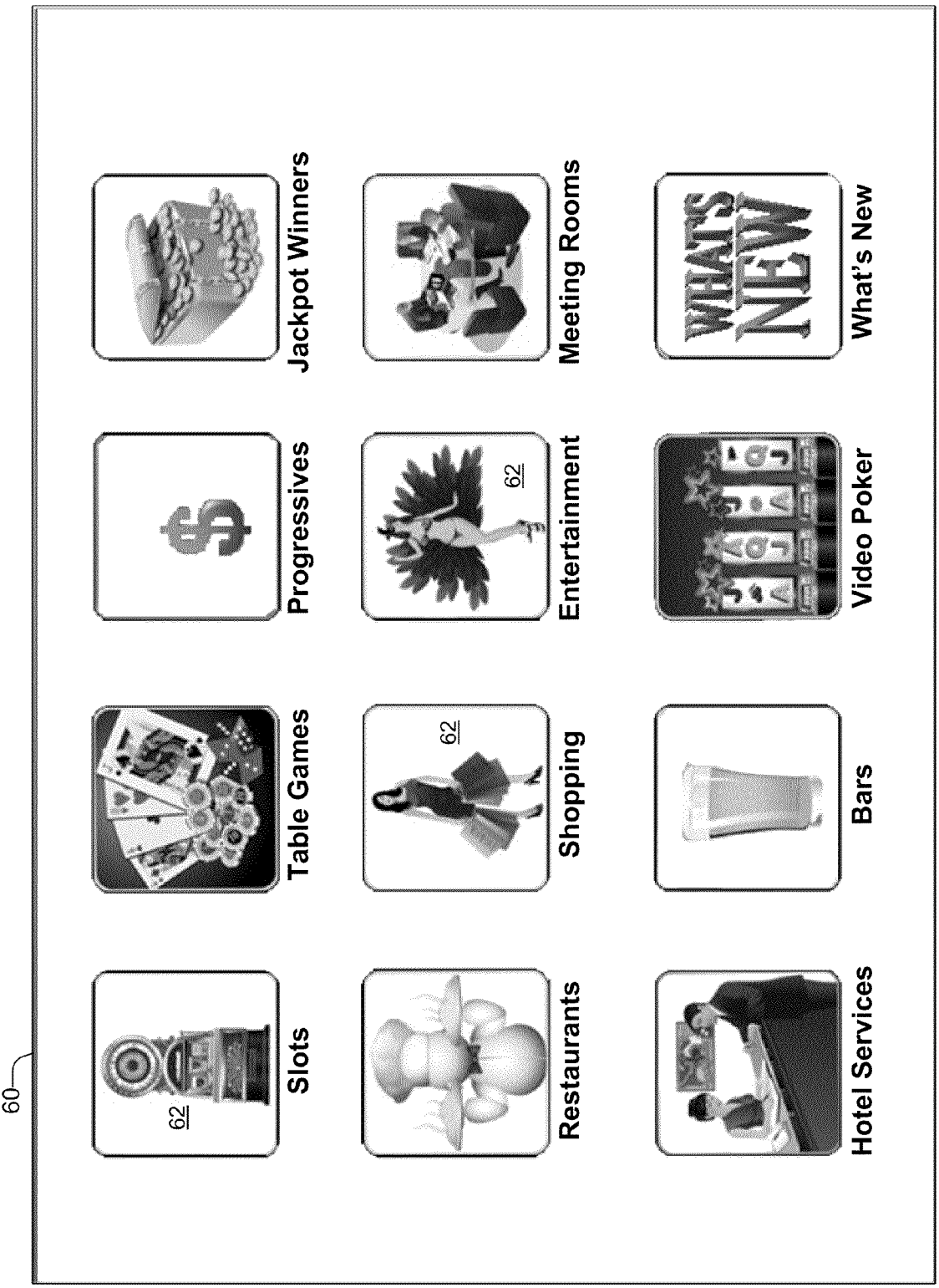
FIG. 2 is a drawing showing an initial screen showing navigation keys, in accordance with one embodiment of the present invention.
Figure 4:
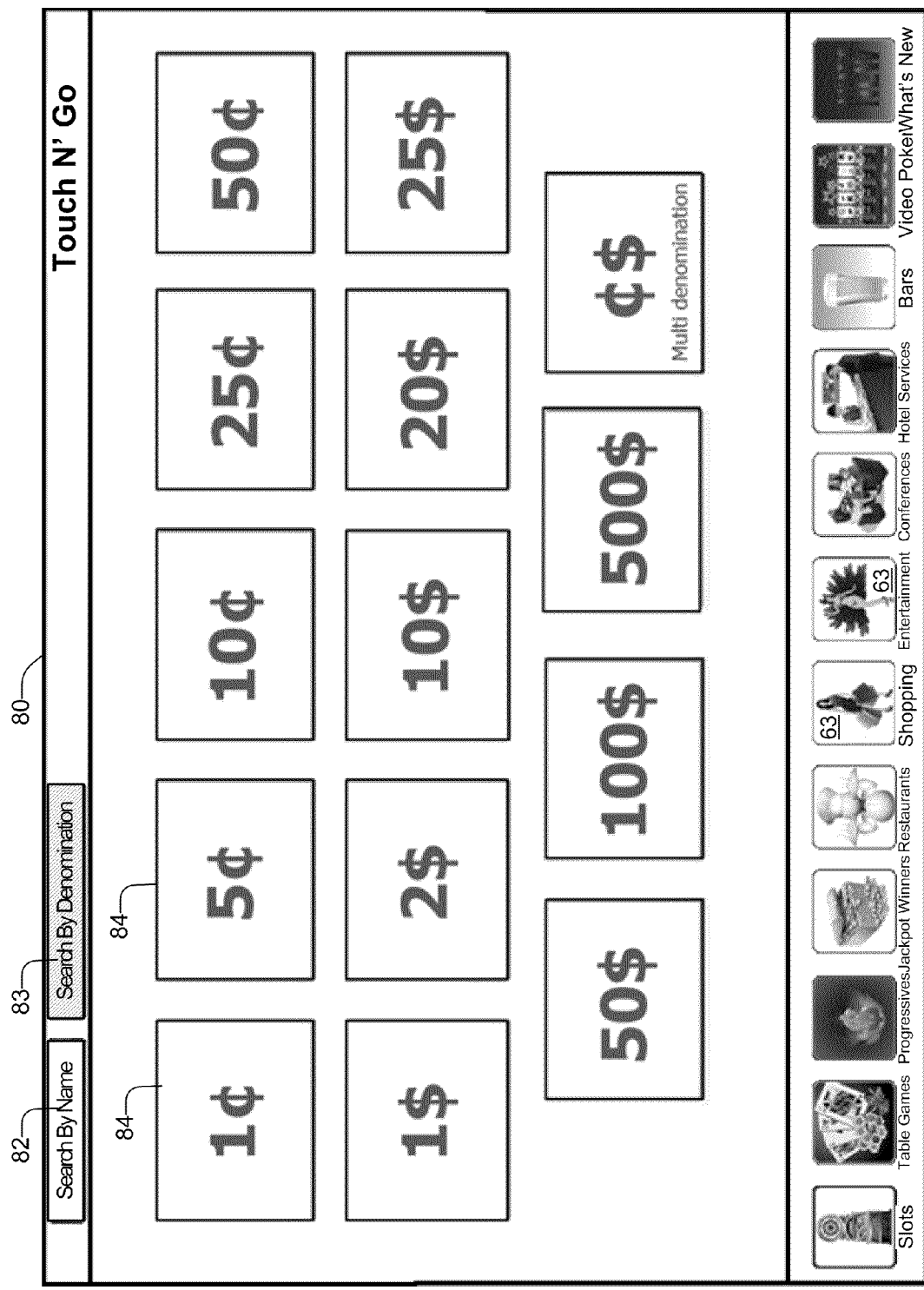
FIG. 4 is a drawing showing a slot machine navigational search screen for searching by denomination, in accordance with one embodiment of the present invention.

FIG. 2 is a drawing showing an exemplary initial screen showing navigation keys or buttons, in accordance with one embodiment of the present invention. This is illustrative of the first screen 60 typically seen by a user looking for navigational aid. If the user 42 is interacting with a touch screen device 52, such a screen containing high level navigational choices could be displayed for his use. In this example, twelve soft buttons 62 are shown: Slots; Table Games; Progressive; Jackpot; Restaurants; Shops; Entertainment; Conventions; Hotel; Bar; Video; and What's Happening or What's New. If the user 42 were to "press" or select the "Slots" button 62, a screen showing different slot machine games would be displayed (FIGS. 4 and 5). He could then select the slot machine game he wanted, and a dynamic map to slot machines providing that game would be presented to him, allowing him to easily navigate to the desired games.

Figure 3:
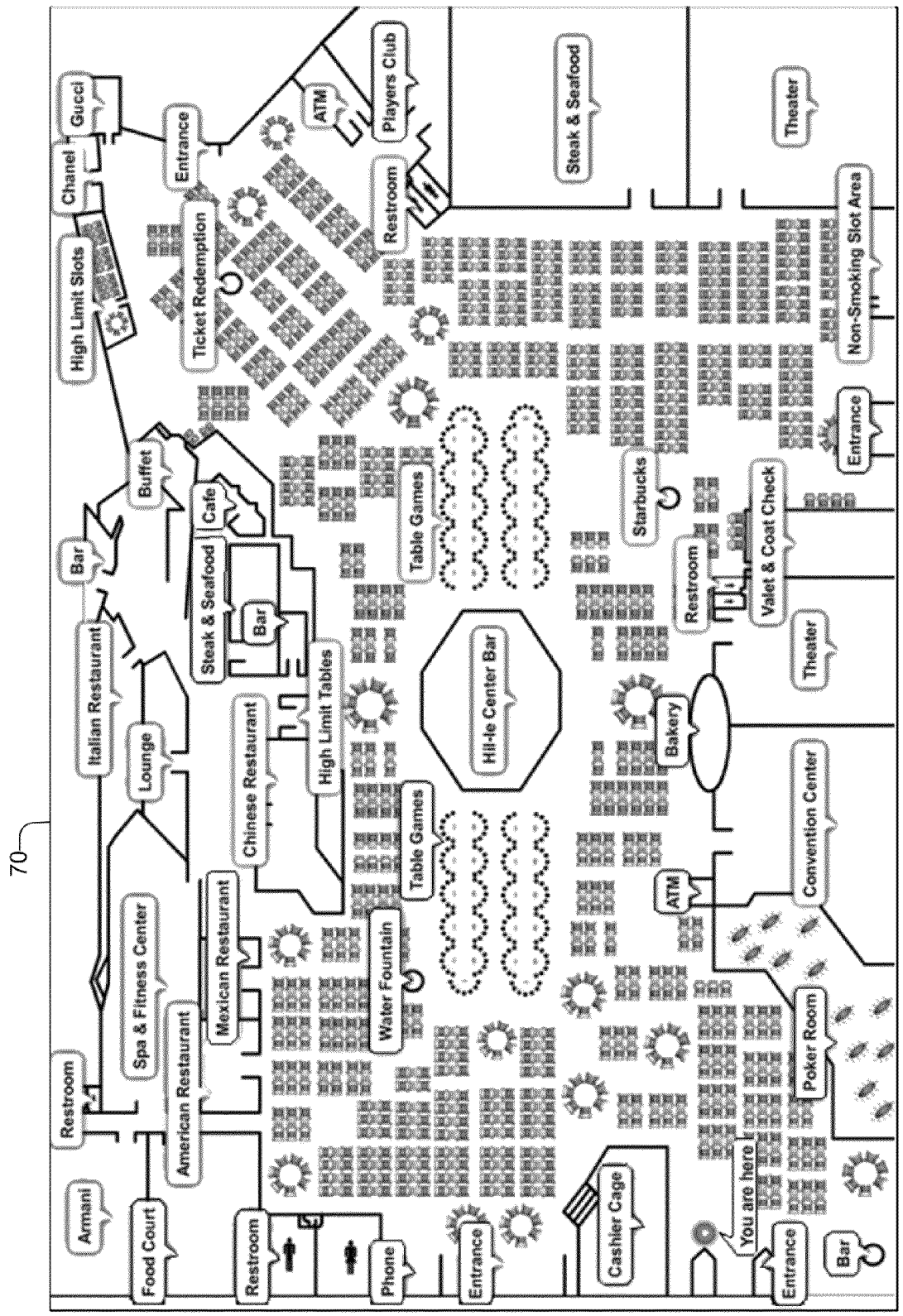
FIG. 3 is a drawing showing an exemplary floor map, in accordance with one embodiment of the present invention.

FIG. 3 is a drawing showing an exemplary floor map, in accordance with one embodiment of the present invention. This floor map 70 is utilized in FIGS. 6A through 6D, 7A through 7C, and 14 to illustrate dynamic route mapping. In some embodiments, such an exemplary floor map 70 may also be displayed for those who do not wish to utilize the dynamic route mapping features of the present invention.

FIG. 4 is a drawing showing a slot machine navigational search screen 80 for searching by denomination, in accordance with one embodiment of the present invention. The screen 80 may be entered by pressing a "Slots" navigational key or button 62, 63. It displays soft keys or buttons 84 for different denominations of slot machines. In this embodiment, there are selection keys or buttons 84 shown for: 1¢; 5¢; 10¢; 25¢; 50¢; $1, $2; $10; $20; $25; $50; $100; $500; and ¢$ (multi denominational) slot machines. Selecting one of these selection keys or buttons 84 could result in a screen showing the various slot machine games available for that denomination. There is also a "Search by Name" button or key 82 on the top of the screen that allows the user to switch to searching by game name as shown in FIG. 5.

Also, across the bottom of this navigational screen, as well as other types of navigational screens, is a row 61 of the same high level navigational keys or buttons 62 shown in FIG. 2, except smaller, so as to fit across the bottom of the screen. These smaller navigational keys 63 allow a user to switch from searching for slot machines to searching for other things, such as restaurants, bars, table games, etc., without the necessity of backing up. In this embodiment, the identification of the screen or category currently being accessed can be identified because the corresponding navigational key or button 63 is displayed differently than the other keys or buttons 63. For example, it could be "grayed" out or made inactive. It may have its lettering in a different color. Other methods of identifying the current screen are also within the scope of the present invention. Also, other placements of the high level navigational keys or buttons are also within the scope of the present invention.

Figure 5A:
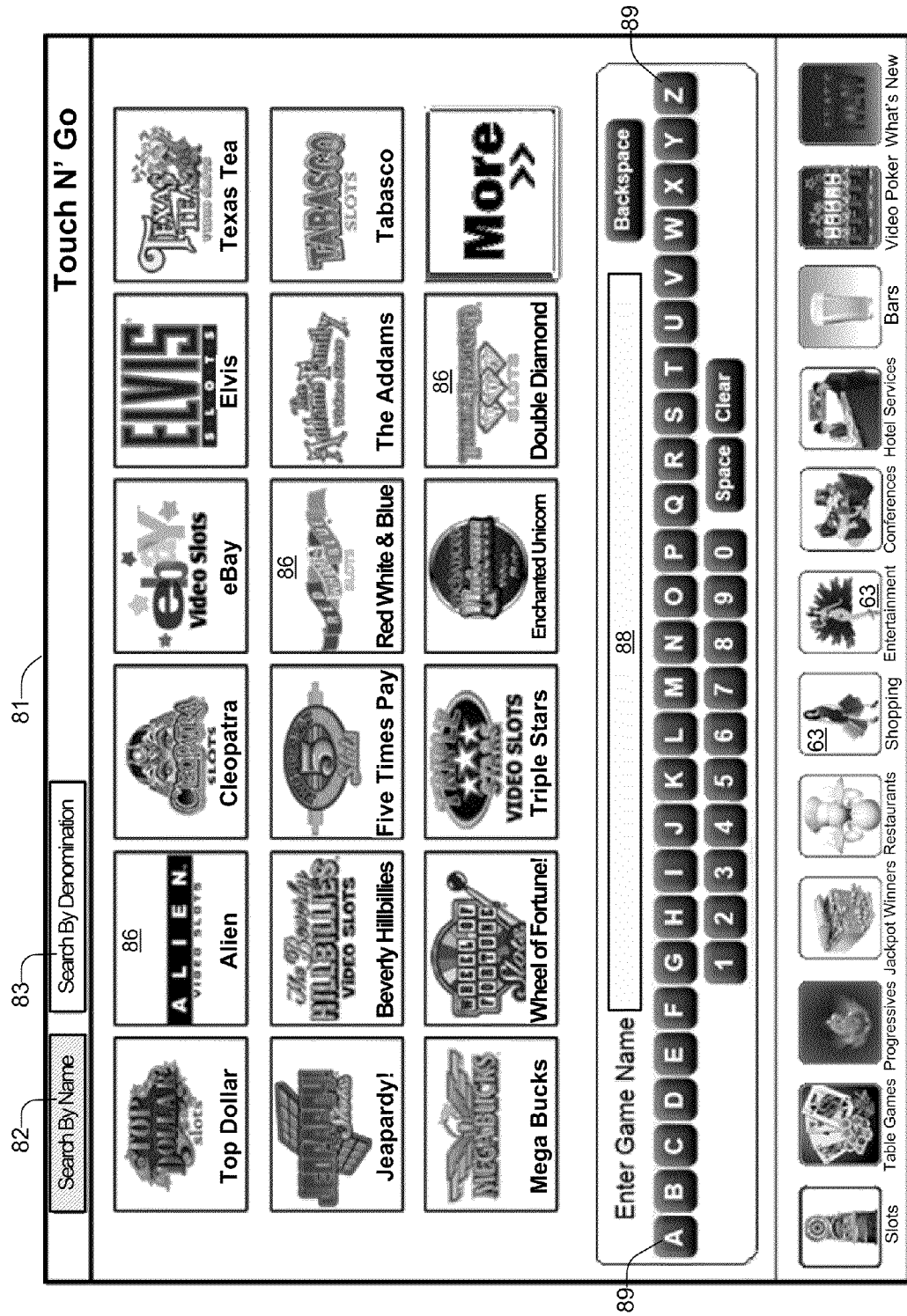
FIGS. 5A and 5B are drawings showing a slot machine navigational search screen for searching by game name, in accordance with one embodiment of the present invention.

FIG. 5A is a drawing showing a slot machine navigational search screen 81 for searching by game name, in accordance with one embodiment of the present invention. In this example, seventeen navigational keys or buttons 86 are shown, in three rows of six, with an eighteenth key or button for "More". When this key 86 is "pressed" a second screen showing slot machine games is presented. This can continue as long as necessary, with the screens typically wrapping around to the first screen of slot games. The order that games are displayed may be based on their overall popularity. Some games may be promoted, either by the venue, by the owner of the game, or for other reasons. Slot machine companies may pay a casino or provider of this invention for such a promotion. Also, when a user is identified to the system or casino through a player's card or other identification, his favorite or most recently played games may be displayed first. They may be displayed for him in reverse order of his last play of those games, with the most recently played games listed first.

One of the games shown in this FIG. is "Triple Stars", which will be utilized as an example of navigation in FIGS. 6A through 6D and 7A through 7C. Also note that there is a "Search by Denomination" button 83 on the top of the screen that switches to the screen in the previous FIG. 4. Furthermore, this screen may be entered from the Search by Denomination slot game screen 80 (FIG. 4), displaying only those games of the specified denomination. Also, on the bottom of the screen is a row 61 of the smaller high level navigational keys or buttons 63, with the "Slots" selection altered to identify the current screen.

Below the three rows of navigational keys or buttons 86 is a box 88 for a user to type in the name of a game. Below the box 88 are keys or buttons 89 for the 26 letters used for the English language, ten digits, backspace, space, and clear, provided to key in the name of a game in the box. In situations where a user has the ability to key in letters and digits, such as with a keyboard, these character and digit buttons 89 may not be included in the display. If the user keys in the name of a game, the result is similar to that of pressing the corresponding game navigational key or button 86. Alternatively, the system may be implemented so that navigational keys or buttons 86 are presented on the top of the screen that start with the sequence character keys 89 pressed. This would typically be dynamic, with the number of navigational keys or buttons 86 presented decreasing as the number of character keys 89 pressed increased.

Figure 5B:
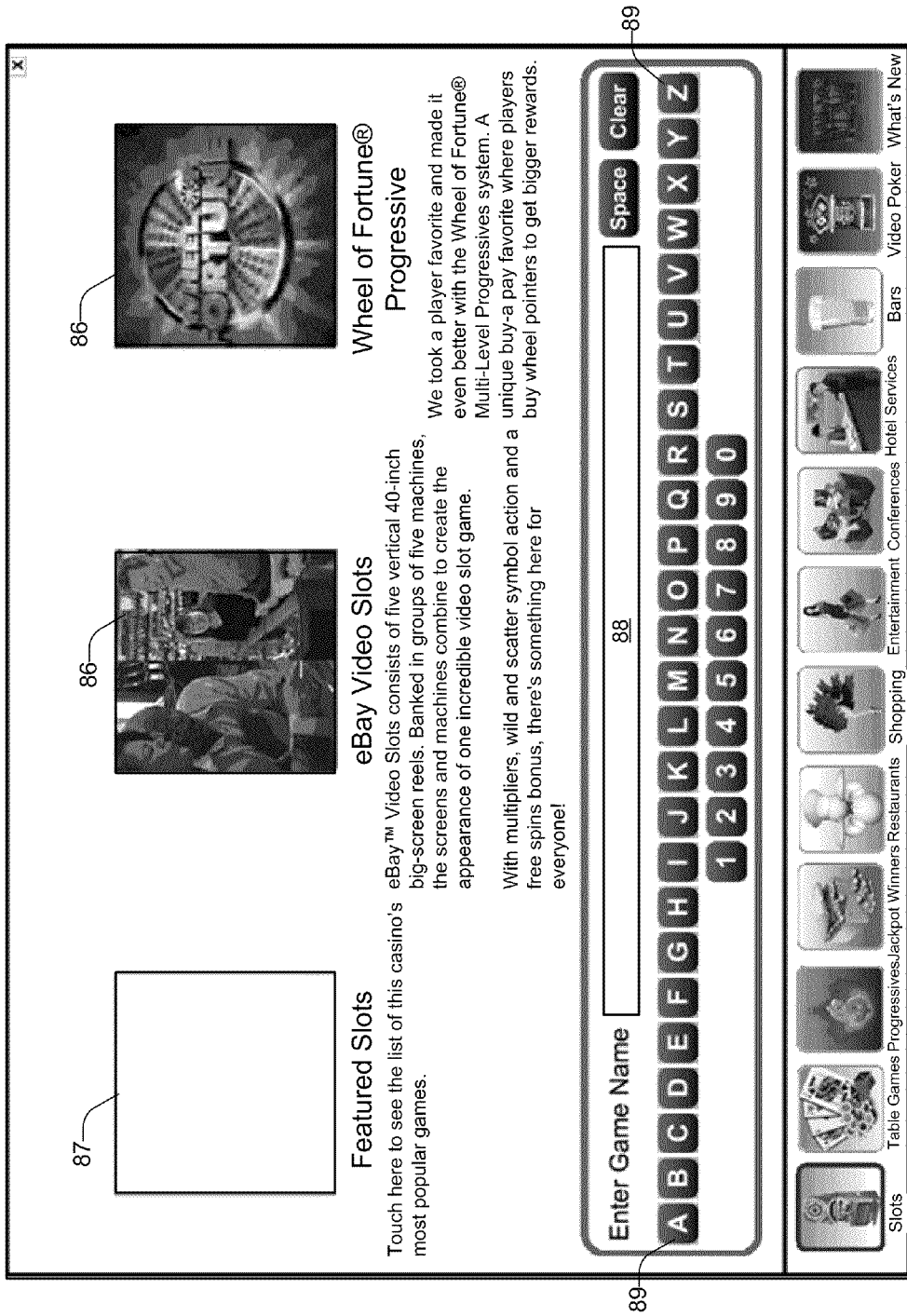

FIG. 5B is a drawing showing a slot machine navigational search screen 81 for showing featured slot machines, in accordance with one embodiment of the present invention. In one embodiment of the present invention, this screen is displayed before the search by name screen 81 shown in FIG. 5A. This screen highlights a limited number of featured slot machines, and then a user may access the screen shown in FIG. 5A by clicking on a button or navigation key. In this example, three alternatives are shown. The first alternative button or navigation key will display the screen 81 shown in FIG. 5A. There are two additional navigation buttons or keys displayed, one for eBay Video Slots, and one for Wheel of Fortune Progressives. There is a description of these games below the navigation buttons or keys, and if one of them is pressed or selected, a route is drawn to a bank of the corresponding slot machines (see FIGS. 6A-6D and 7A-7C). Below these three navigational keys or buttons is a box 88 for a user to type in the name of a game, similar to that shown in FIG. 5A. Below the box 88 are keys or buttons 89 for the 26 letters used for the English language, ten digits, backspace, space, and clear, provided to key in the name of a game in the box. Also, on the bottom of the screen is a row 61 of the smaller high level navigational keys or buttons 63, with the "Slots" selection altered to identify the current screen.

FIGS. 6A through 6D are drawings showing an exemplary route 74 to a first set of slot machines 78, in accordance with one embodiment of the present invention. These screens are typically entered through selection from a navigational button 86 in the screens in FIGS. 4 or 5. In this example, a user selected or pressed the "Triple Stars" key or button 86 in FIG. 5 to access these navigational screens.

A floor map 70 of the venue, similar to that shown in FIG. 2, is displayed. The different banks of slot machines 78 providing the selected game are highlighted on the floor map 70. A route 74 is then drawn dynamically on the map 70 from a "You are Here" starting location 72 to the desired location 78. In the case of a touch screen 52, this "You are Here" starting location 72 is typically the location of the touch screen device 52. In the case of a location enabled device, it may be the actual location of the device, and thus presumably the user thereof. In the case of personal computers 58 and laptops 56, a user may select an entrance or other location for his You are Here starting location 72. In some embodiments of the present invention, users are provided with the capability of changing this starting location 72 dynamically. For example, on a touch screen device 52, the user may touch the current You are Here location 72, and then be allowed to touch the screen 52 elsewhere for a different starting location.

Figure 6A:
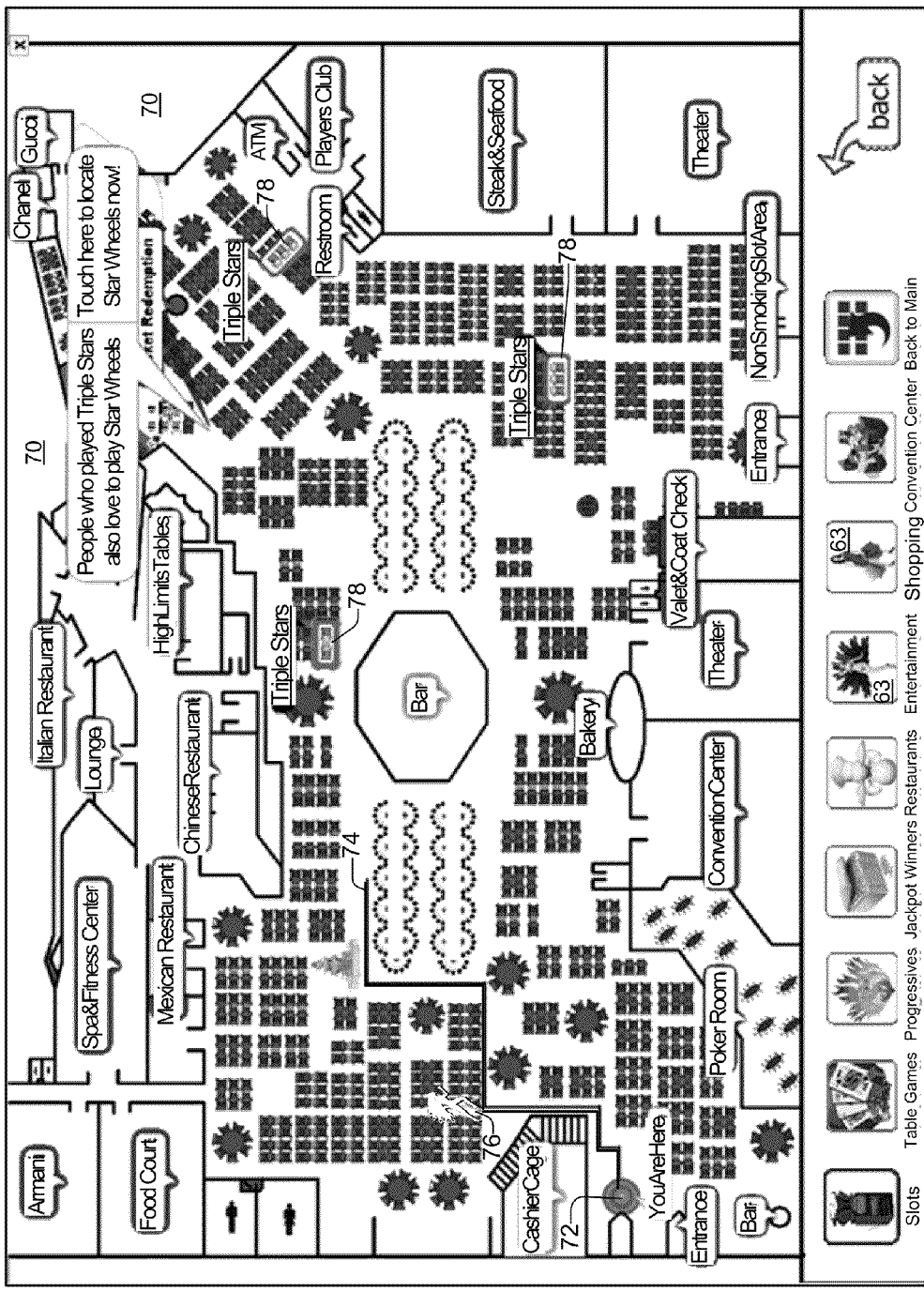
FIGS. 6A through 6D are drawings showing an exemplary route to a first set of slot machines, in accordance with one embodiment of the present invention.
Figure 6B:
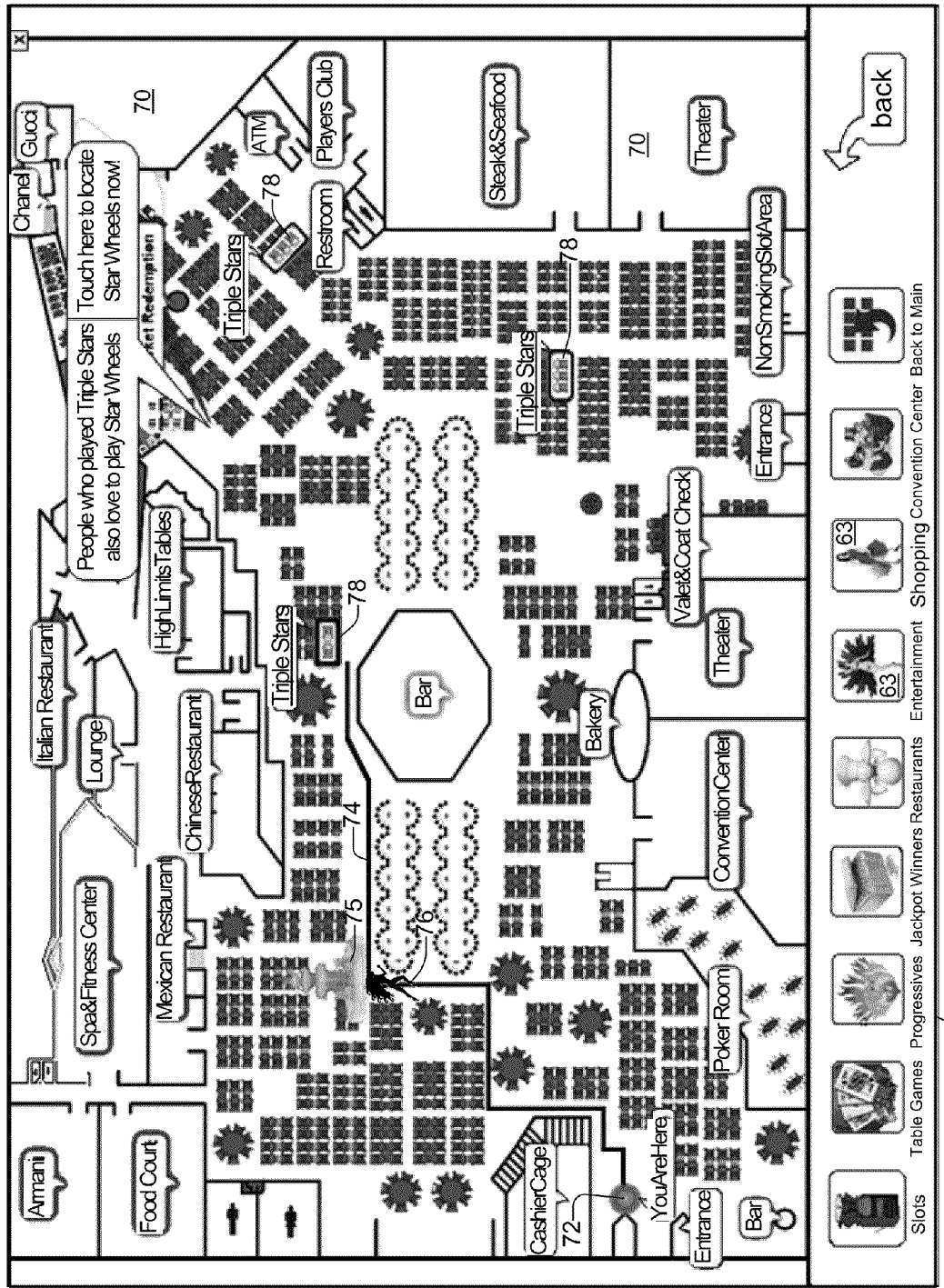
Figure 6C:
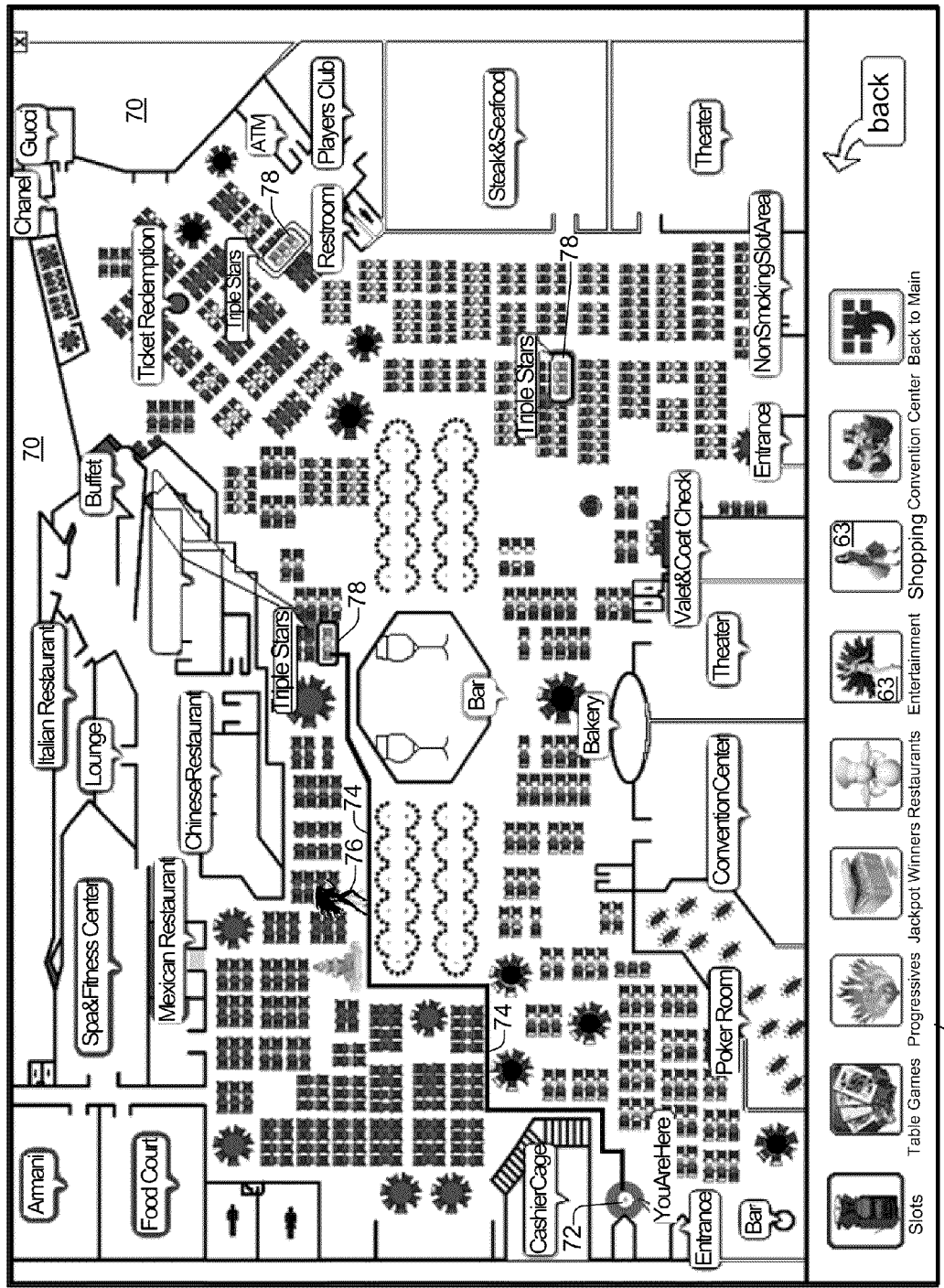
Figure 6D:
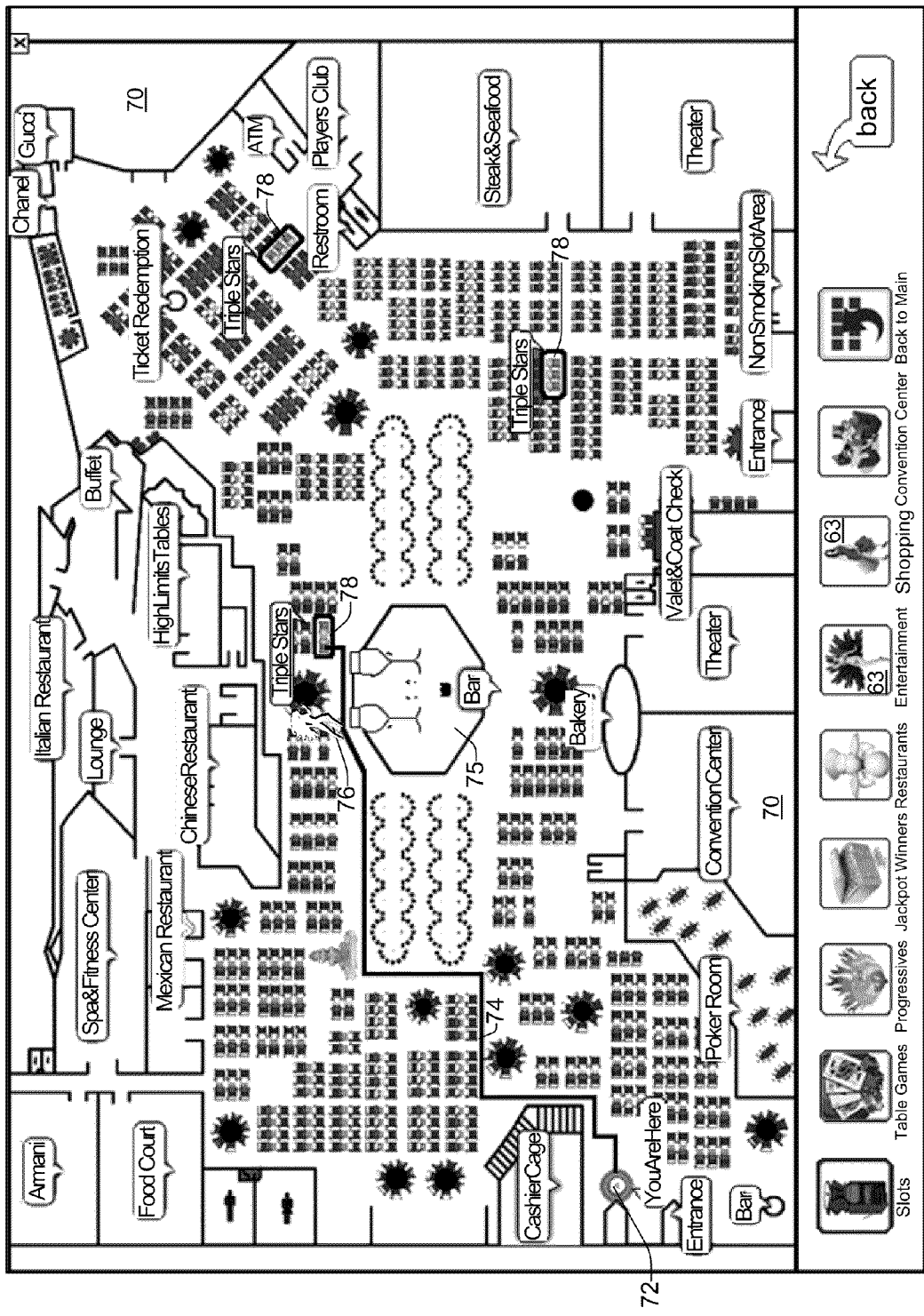

A route 74 is then drawn dynamically from the You are Here starting location 72 to the desired attraction 78. In this example, a route 74 is drawn to one of these banks of Triple Star gaming machines 78. FIG. 6A shows the route 74 about ⅔ complete as it winds its way by the Cashier's Cage, slot machines, table games, and a fountain. An avatar 76 is shown running along the route. FIG. 6B shows the route 74 complete to the selected bank of Triple Stars machines 78. As the avatar 76 runs by the fountain, it expands in size, to shrink back to its normal size as she passes it. FIG. 6C shows the avatar 76 between the fountain and a bar, with the fountain shrunk back to its normal size. The bar then shows a pair of wine glasses as the avatar 76 approaches. As the avatar 76 runs by the bar, the wine glasses are "toasted" and some wine is spilled in FIG. 6D. She then arrives at the bank of Triple Stars machines 78, and the wine glasses disappear. The avatar 76 then typically repeats the journey from the starting location 72 to the desired attraction 78 several times, with the graphics changing as she progresses along the specified route 74 passing landmarks 75. In one embodiment of the present invention, the route 74 is redrawn each time the avatar 76 runs along it. In another embodiment, the route 74 remains on the map 70 for the duration.

In the map 70 shown in this FIG., three banks of Triple Stars machines 78 are shown. Different heuristics may be utilized to identify which bank or alternative is provided a route to first. For example, the system may initially route to the closest such attraction or facility. Or, in the case of slot machines, the closest bank of machines may be full, and the user is routed to the closest bank with an open machine. Or, a user may be routed to a bank with a machine that he enjoyed playing the previous time he visited. In the case where the user selected slot machines based on denomination, the machines shown would typically be those of the corresponding denomination. Other heuristics, methods, and techniques are also within the scope of the present invention. In some embodiments, the user is given the option of choosing a different bank of slot machines. He may do this through some selection means, such as touching the desired bank of slot machines on the touch screen.

FIGS. 6A and 6B show an additional feature. A Personalized Recommendation System (PRS) is shown. Text is shown popping up to indicate alternatives. In this example, the user is informed in this popped up text that: "People who played Triple Stars also love to play Star Wheels". Then, there is displayed over the map 70 along side that text: "Touch here to locate Star Wheels now!" If the user does press or select this area of the screen, the map 70 changes from showing a route 74 to a bank of Triple Stars slot machines to showing a route 74 to a bank of Star Wheels slot machines. In another alternative, he may be asked "Would you like a free coupon to play Star Wheels?" Other types of marketing tying and promoting are also within the scope of the present invention. Thus, for example, the user may be given suggestions for where to eat. The tying may be done through statistics gathered through use, or users may be pushed for marketing reasons. Thus, the company owning the Star Wheels slot machines may be paying the casino for pushing their games to Triple Stars players. Or, the casino may make more money on Star Wheels than it does on Triple Stars. In another alternative, a casino may attempt to push their guests to less heavily utilized slot machine games. Other types of PRS promotions and advertising are also within the scope of the present invention.

Figure 7A:
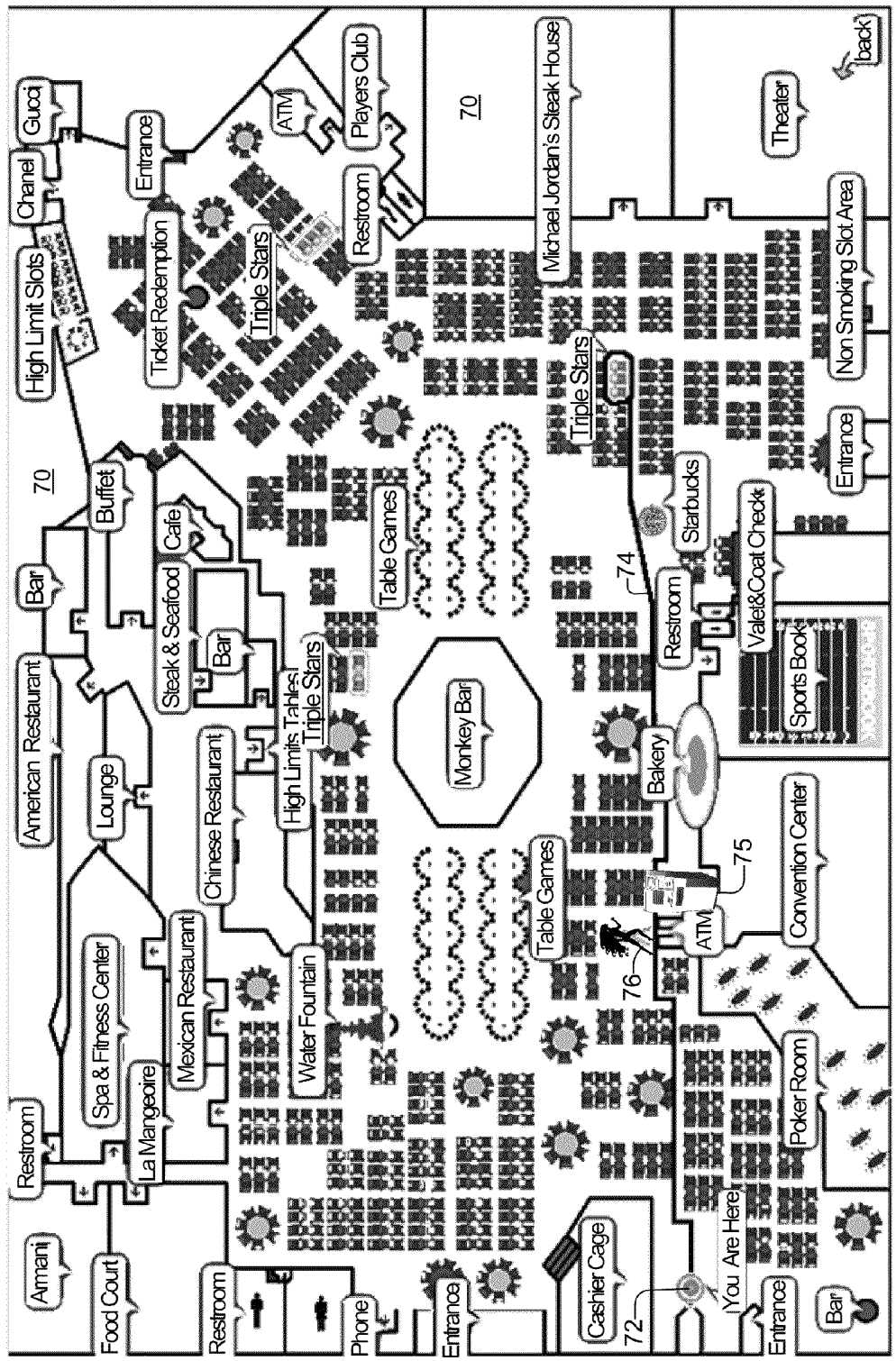
FIGS. 7A through 7C are drawings showing an exemplary route to a second set of slot machines, in accordance with one embodiment of the present invention.
Figure 7B:
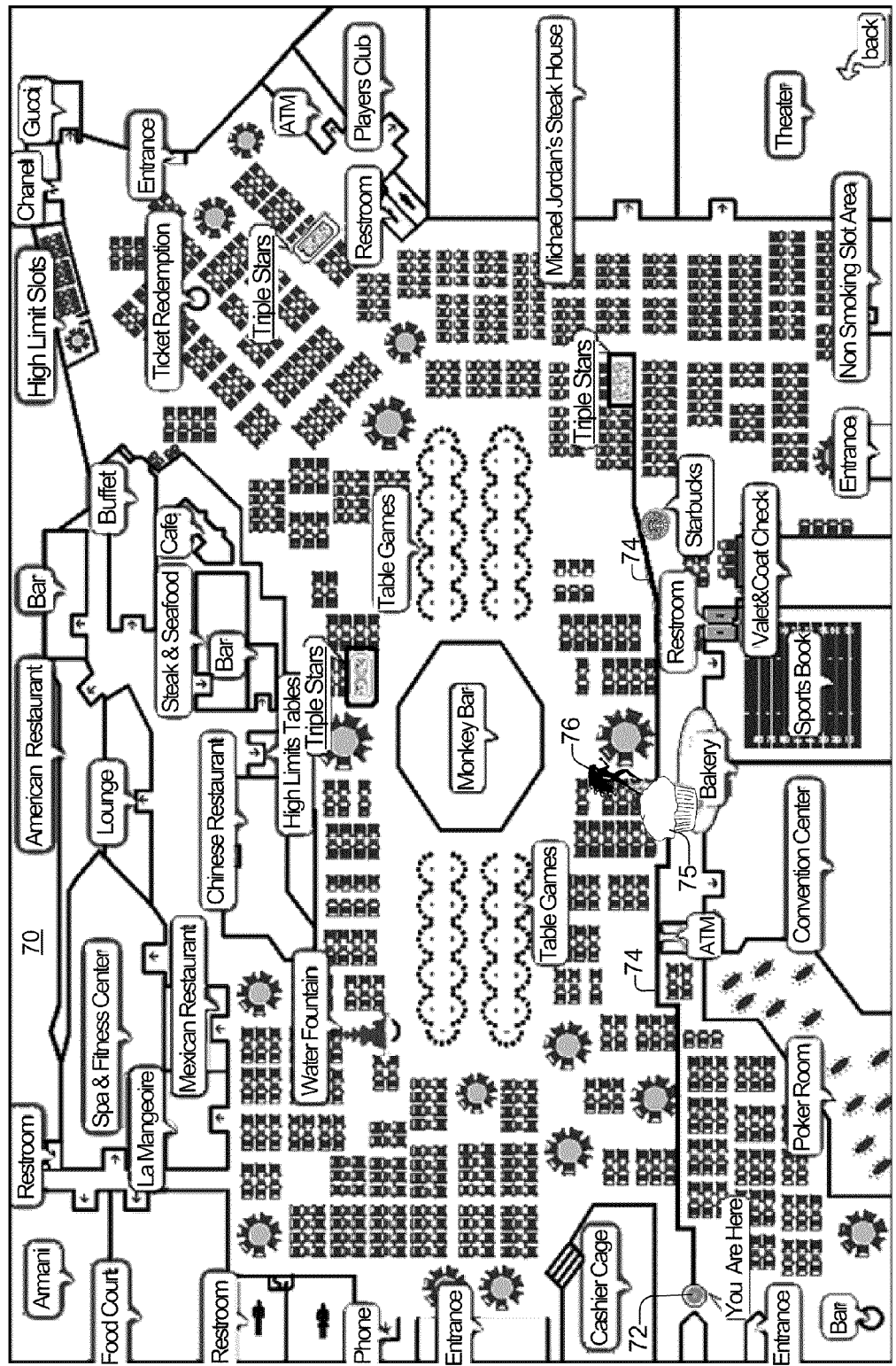
Figure 7C:
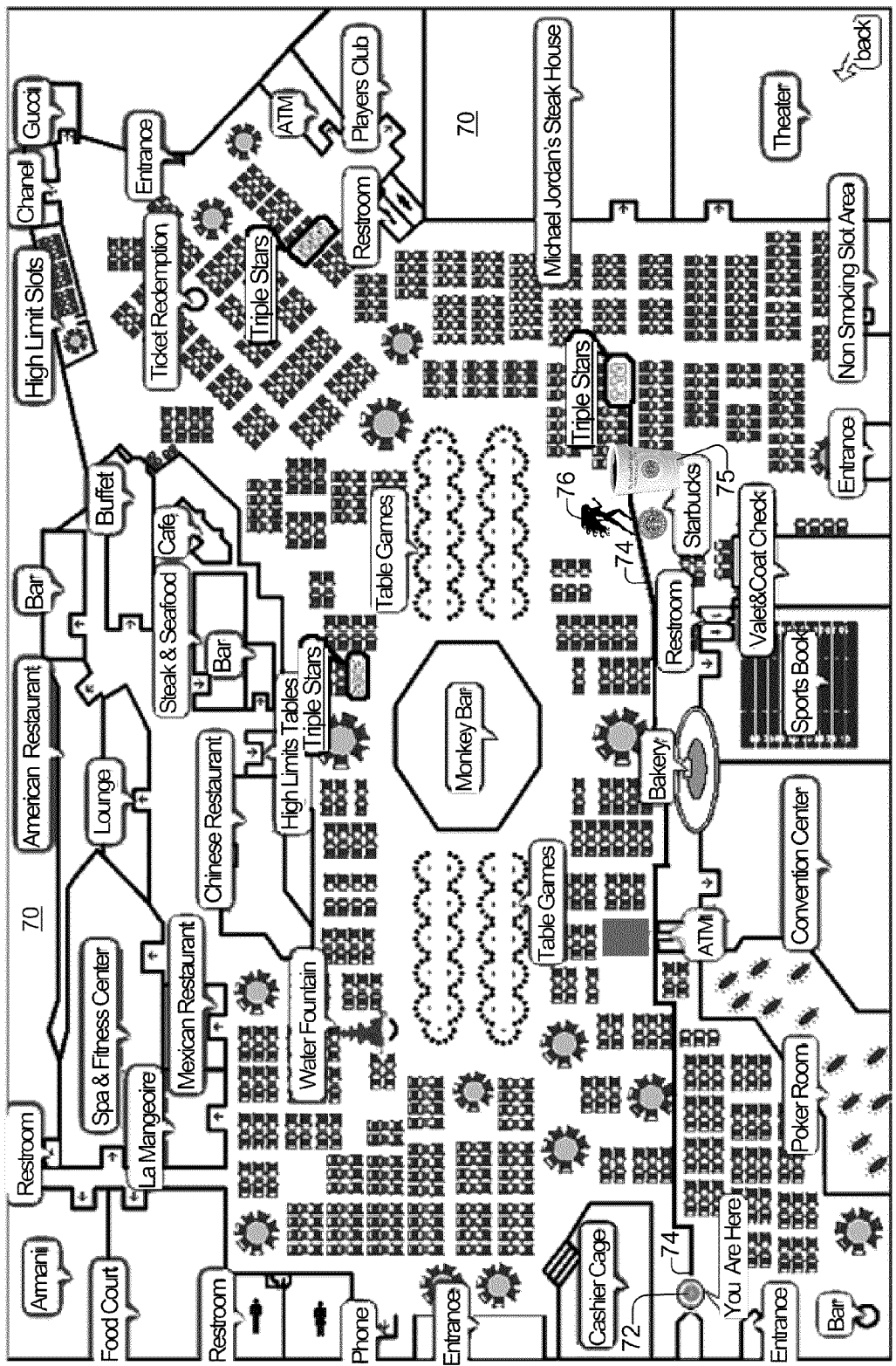

FIGS. 7A through 7C are drawings showing an exemplary route 74 to a second set of slot machines 78, in accordance with one embodiment of the present invention. In these FIGs., a route 74 is drawn to a second bank of Triple Stars slot machines 78. This route 74 runs by an ATM machine, a bakery, and a Starbucks landmarks 75. FIG. 7A shows the avatar 76 passing the ATM machine. As she runs past it, a picture of an ATM machine appears. Then, in FIG. 7B, as the avatar 76 runs by the bakery, the ATM machine has disappeared, and a cupcake appears by the bakery. The, in FIG. 7C, as the avatar 76 runs by the Starbucks, the cupcake from FIG. 7B disappears, and a cup of Starbucks coffee appears. This is typically repeated several times, with the ATM appearing and disappearing, followed by the cupcake appearing and disappearing, followed by the Starbucks coffee appearing and disappearing, as the avatar 76 runs the provided route 74 by each landmark.

This repeated use of animation of landmarks 75 as the avatar 76 passes landmarks 75 allows users to easily remember routes 74 to attractions 78. Thus, in the example in this FIG., users quickly remember to go to the ATM machine, then from there, to the bakery, from there to the Starbucks, and from there, to the sought for attraction 78, the Triple Stars slot machines. Preferably, each landmark 75 is in sight of the next one, so that those users taking advantage of this aspect of the present invention can easily move from landmark 75 to landmark 75 until they reach their selected destination 78. Additionally, in some embodiments, users may be provided with voice instruction on the route 74. Thus, if a user is using a smart phone 54, he may be given verbal directions in terms of landmarks. So, in this example, he may be told to proceed to the ATM machine, from there to the bakery, from there to the Starbucks, and from there to the bank of Triple Stars slot machines. Other alternatives and embodiments are also within the scope of the present invention.

In these examples, the avatar 76 shown is a running woman. Other avatars are also within the scope of the present invention. Also, in some embodiments, a user is provided the ability to change avatars 76, or in other embodiments, to select one. Also, the avatar 76 in these FIGs. is shown in either black or white, whichever provides the best contrast. Similarly, the route 74 is shown in black or white, again, depending on what provides the best contrast. In other embodiments, the map 70, route 74, and avatar 76 are shown in color, and different colors may be utilized to highlight the route 74 being provided to users.

These examples show providing a route 74 from an entrance to a casino to a selected bank of slot machines. It should be understood that the present invention is not limited to banks of slot machines. The present invention can provide this sort of routes 74 to essentially any attraction or feature 78 that can be placed on a floor map 70 of the venue, such as the floor map 70 shown in FIG. 3. This includes the types of attractions 78 listed on the high level navigation screen 60 shown in FIG. 2, as well as other facilities, such as restrooms, ATMs, cashiers, ticket redemption centers, security, etc. The examples shown herein are casino attractions. However, the present invention is not limited to such, but rather includes other types of facilities, including, for example, shopping centers, airports, and other large venues and facilities.

Figure 8:
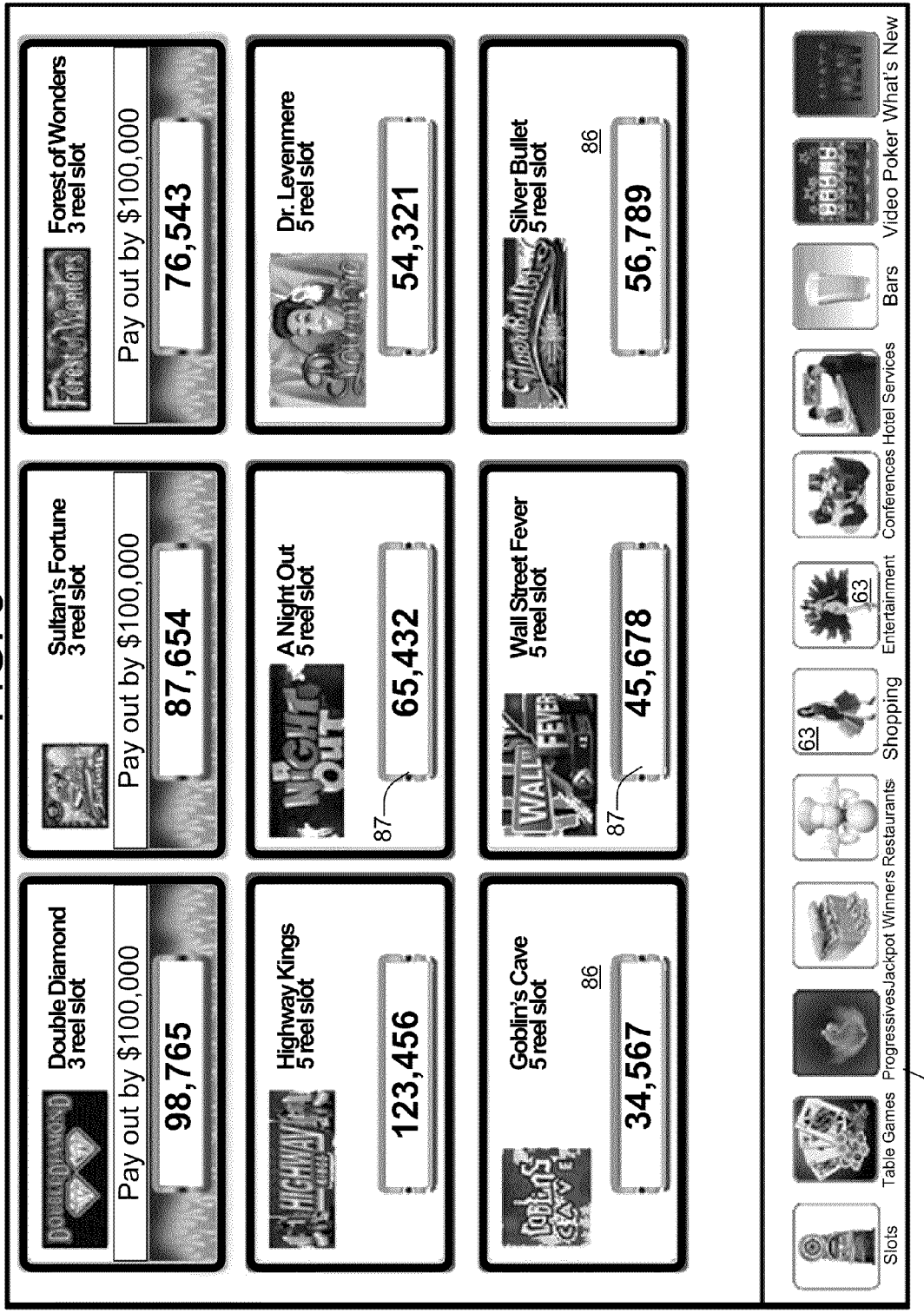
FIG. 8 is a drawing showing a progressive slot machine navigational search screen, in accordance with one embodiment of the present invention.

FIG. 8 is a drawing showing a progressive slot machine navigational search screen, in accordance with one embodiment of the present invention. A progressive jackpot is a jackpot (highest payoff) for a gaming machine such as a slot machine or video poker machine where the value of the jackpot increases a small amount for every game played. Often, multiple machines are "linked" together to form one large progressive jackpot that grows more quickly because multiple players are contributing to the jackpot at the same time. The amount of the jackpot is typically shown on a meter as a money value. Typically, the jackpot can only be won by winning the combination with the highest payoff, e.g. a royal flush at a video poker game, or five of the most valuable symbols (lemons, cherries, alligators, etc) on a slot machine. Once a player wins the jackpot, the jackpot typically resets to a preset minimum level. The amount on the jackpot progresses (increases) a small amount for every play on a connected machine. One can often recognize progressive slot machines in a casino by the incrementing meters typically situated above the machines. If the machines are linked or networked together, the meter showing the jackpot size may be shared, or the value shown is identical for each machine.

The size of a jackpot can be a motivating feature whether or not someone plays a progressive slot game, and if they do, which one. This is especially true for linked or shared progressive jackpots. The higher the jackpot, the bigger the potential payout. Also, some games require that the jackpot be paid out when it hits a certain size. Knowing this, the desirability of different progressive games can vary depending on the size of the potential jackpot.

This FIG. shows a progressive slot game screen that shows the current size of the jackpot for different progressive games. In this example, nine progressive games are shown, with navigation selection buttons or keys 86 displayed in three rows of three buttons or keys per row. For each of the progressive games shown, the current size of the jackpot is shown on a meter 87, with the meters 87 showing the totals increasing for each progressive game until someone wins that jackpot. In this example, the top row of progressive games 86 indicates that each of them must pay out when the jackpot hits $100,000. When one of the progressive navigation selection buttons or keys 86 is pressed, that slot machine game is selected, and a route 74 to a bank of those machines is generated, as shown in FIGS. 6A-6D and 7A-7C.

Figure 9:
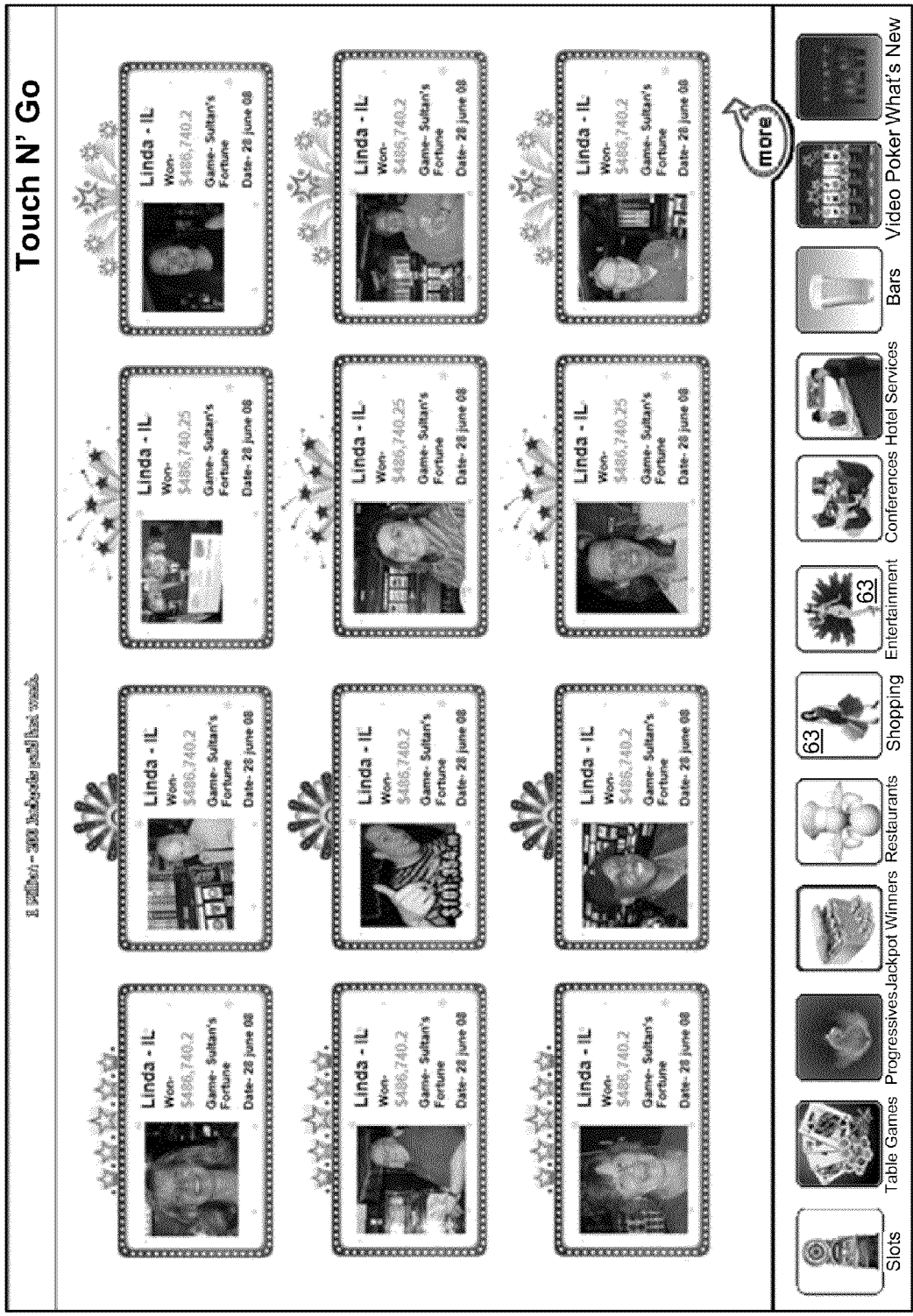
FIG. 9 is a drawing showing a jackpot winners screen, in accordance with one embodiment of the present invention.

FIG. 9 is a drawing showing a jackpot winners screen, in accordance with one embodiment of the present invention. This screen is presented when a "Jackpot Winners" navigational key or button 62, 63 is pushed. Information about a number of jackpot winners and their wins are displayed on this screen. In the embodiment shown in this FIG., information for twelve jackpot winners is shown on each jackpot winners screen. The information is displayed in twelve boxes, arranged in three rows of four boxes per row. There is a "More" button for paging to other jackpot winners screens. In this embodiment, for each jackpot won and highlighted, a shortened name of the winner is displayed, along with the amount won, the name of the game won, and the date of the win. A row 61 of small high level location keys or buttons 63 is located on the bottom of the screen.

Figure 10:
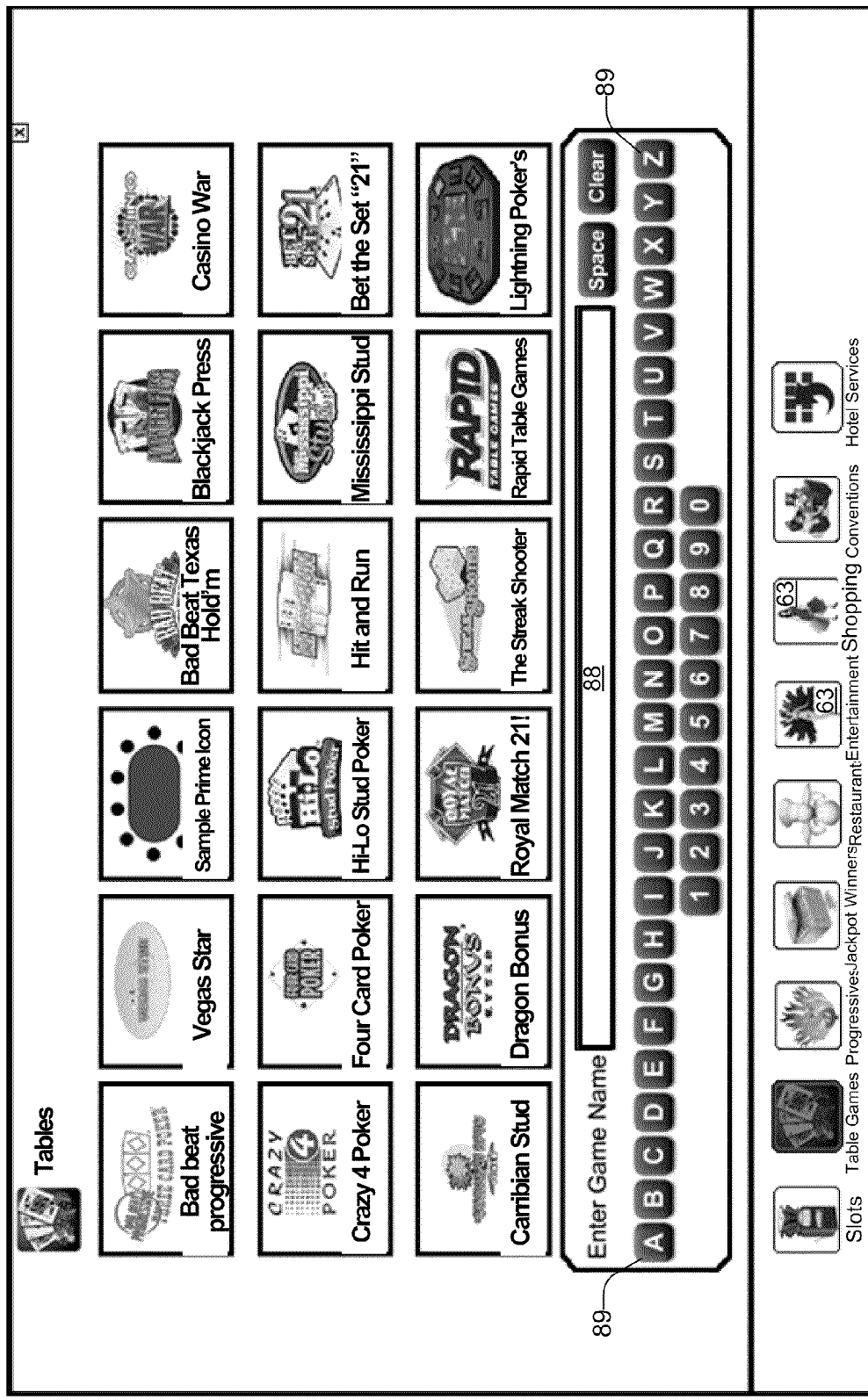
FIG. 10 is a drawing showing a table game navigational search screen, in accordance with one embodiment of the present invention.

FIG. 10 is a drawing showing a table game navigational search screen, in accordance with one embodiment of the present invention. This screen in this embodiment is similar to the Search by Name slot machine game screen 81 shown in FIG. 5, except that this screen is for table games instead of slot games. Navigation buttons or keys are shown for eighteen table games, organized with three rows of six table games per row. When a user pushes one of these keys or buttons, a map is displayed, and a route is dynamically drawn to a location for the selected table game, similar to the routes drawn by example in FIGS. 6A-6D and 7A-7C for banks of slot machines. As with the screen shown in FIG. 5, users are provided the capability of typing in the name of a table game.

Not shown, but also within the scope of the present invention, a screen may be presented to users that provides for denominational searching of table games. Table stakes and limits tend to vary dynamically for table games, depending on player interest and traffic. In many casinos, limits are dynamically set by the pit boss, and often change through time. Many players have preferences for the stakes and limits they will play. For these players, finding a game with limits they are willing to play, is advantageous.

Figure 11:
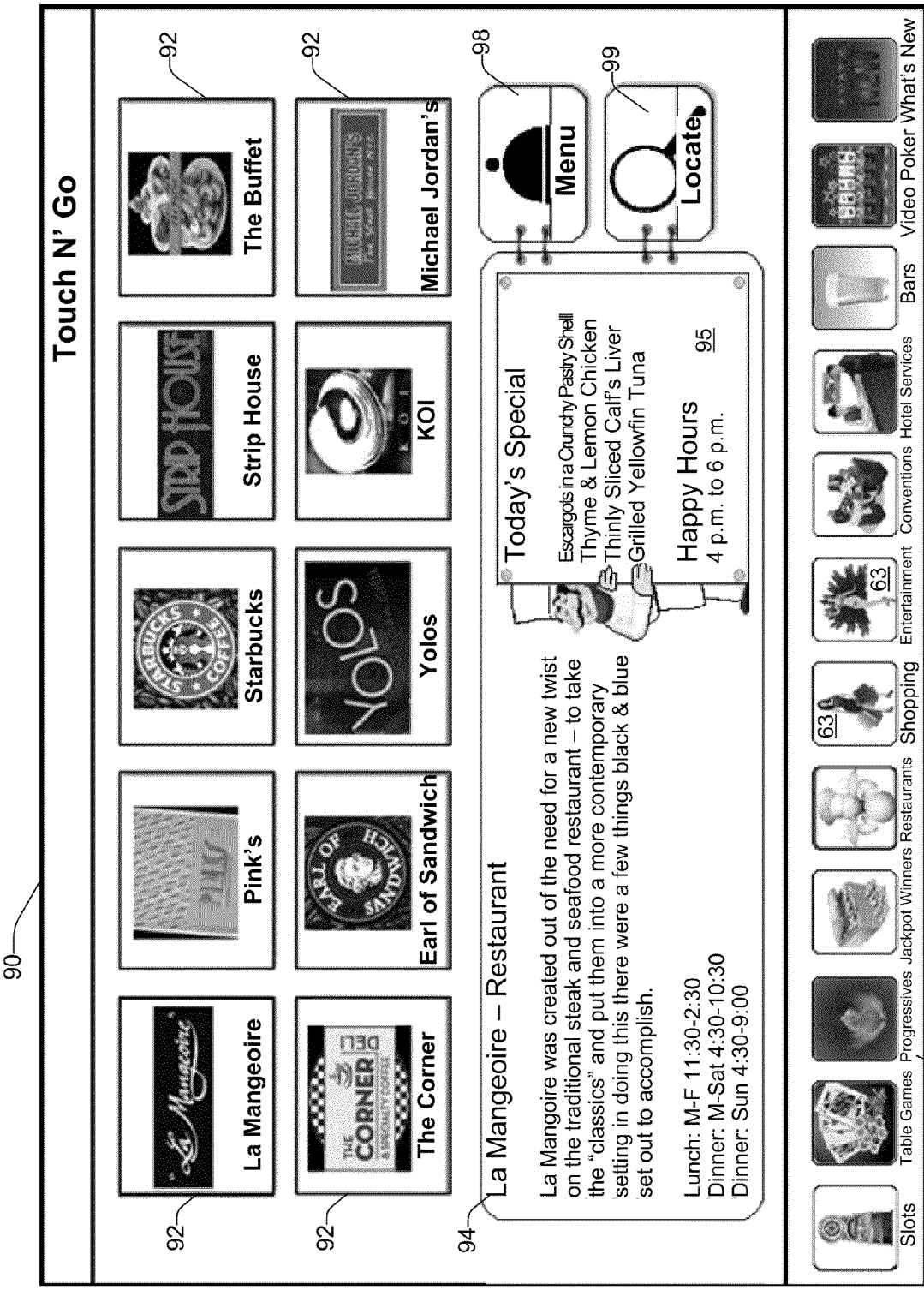
FIG. 11 is a drawing showing a first restaurant informational screen, in accordance with one embodiment of the present invention.

FIG. 11 is a drawing showing an exemplary first restaurant informational screen 90, in accordance with one embodiment of the present invention. The restaurant informational screen 90 may be accessed by clicking or pushing a "Restaurant" navigational key 62, 63, such as is found on the high level navigational screen 60 shown in FIG. 2 or at the bottom of the informational screens 61. In this example, navigational keys or buttons 92 are shown for ten restaurants, organized in two rows of five per row. Below the ten buttons 92 is an area for describing one of the restaurants. In this example, information for the La Mangeorire restaurant is displayed. On the left side, there is a brief description of the restaurant and its hours of operation 94. In the middle, there is an area that shows Today's Specials and Happy Hour hours 95. On the right side, there are two tabs or buttons 98, 99. One, titled "Menu" 98 provides a display of menu items for the restaurant (see FIG. 12). The other, titled "Locate" 99 links to the mapping system for generating a dynamic route 74 on the map 70 to the restaurant (see FIG. 14). Small high level navigational keys 63 are arrayed across the bottom of the screen 61.

Figure 12:
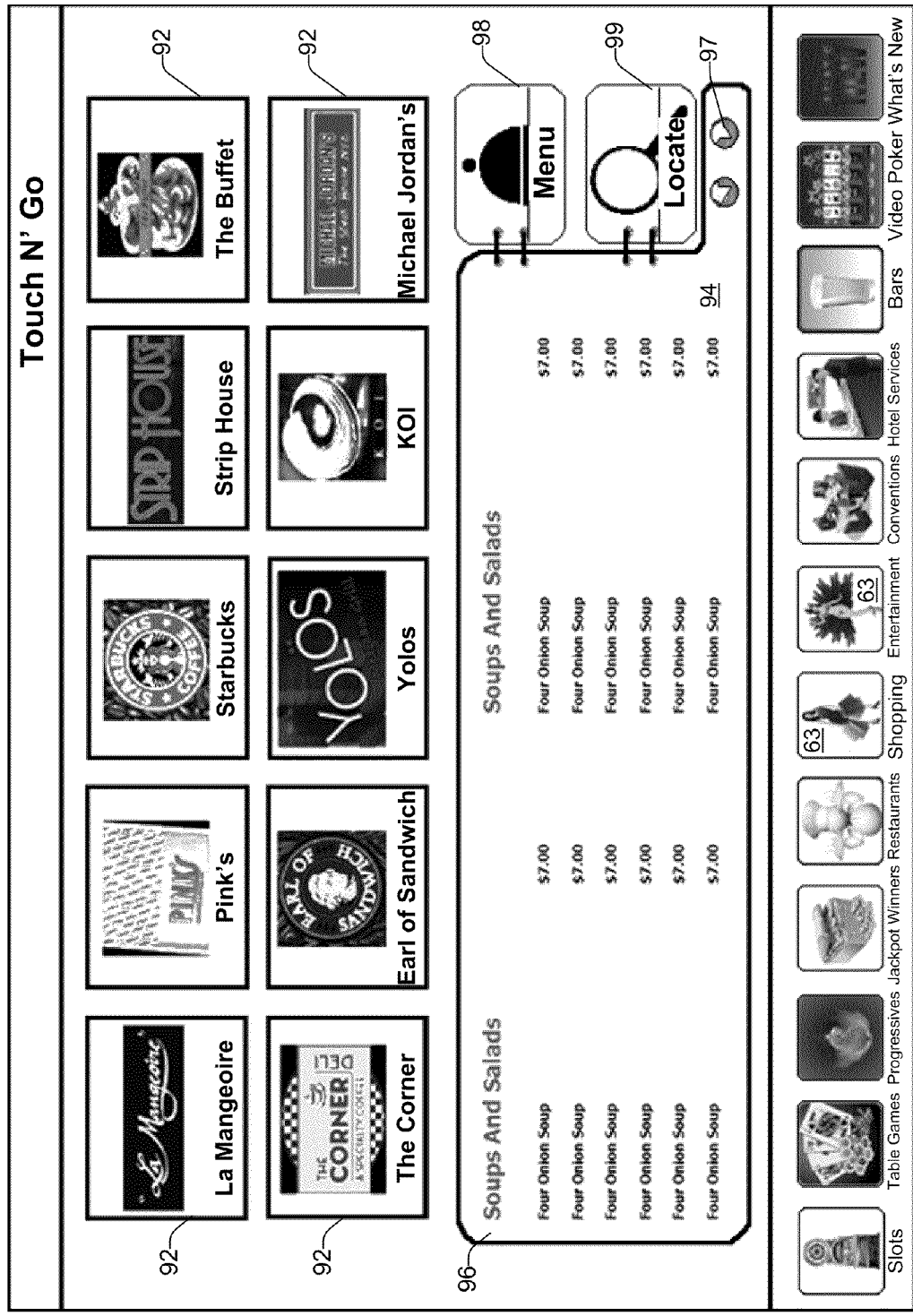
FIG. 12 is a drawing showing a second restaurant informational screen, in accordance with the embodiment shown in FIG. 11.

FIG. 12 is a drawing showing an exemplary second restaurant informational screen, in accordance with the embodiment shown in FIG. 11. This screen is typically displayed in response to a user pressing or selecting a "Locate" button or key 99 as shown in FIG. 11. This FIG. shows a portion of the menu 96 for the selected restaurant. It is structured like the display in FIG. 11, except that menu items 96 are displayed in the middle of the screen, instead of restaurant information 94, 95. Below the "Locate" button or key 99 on the right hand side of the screen are "back" and "forward" keys or buttons 97 that can be used to scroll through the menu 96.

Figure 13:
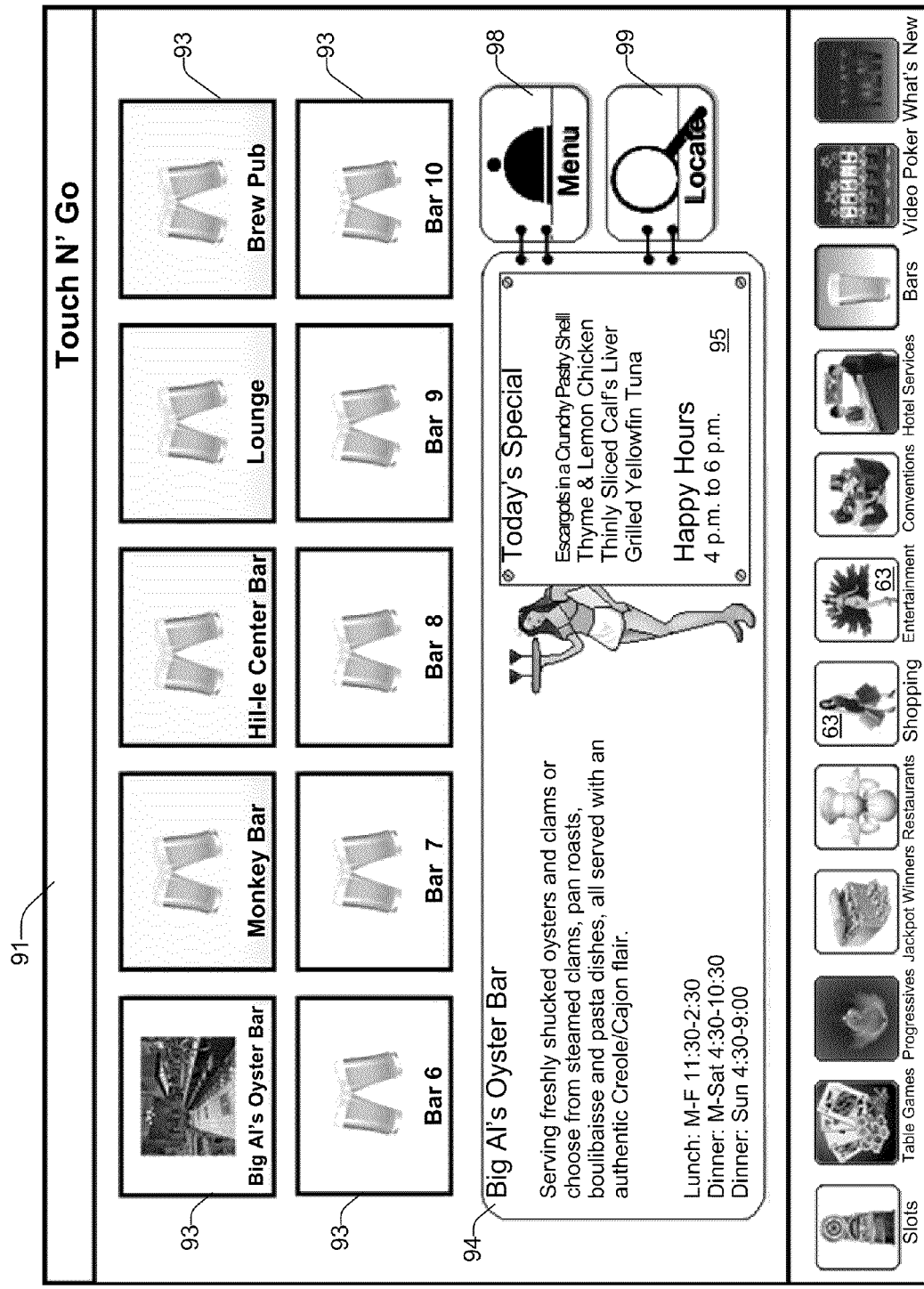
FIG. 13 is a drawing showing a bar informational screen, in accordance with one embodiment of the present invention.

FIG. 13 is a drawing showing an exemplary bar informational screen 91, in accordance with one embodiment of the present invention. This screen is presented when a "Bars" navigational key or button 62, 63 is pushed. This screen is similar to the restaurant informational screen 90 shown in FIG. 11, except that names of and icons for bars and/or clubs are on the buttons or keys 93 across the top of the screen.

Figure 14:
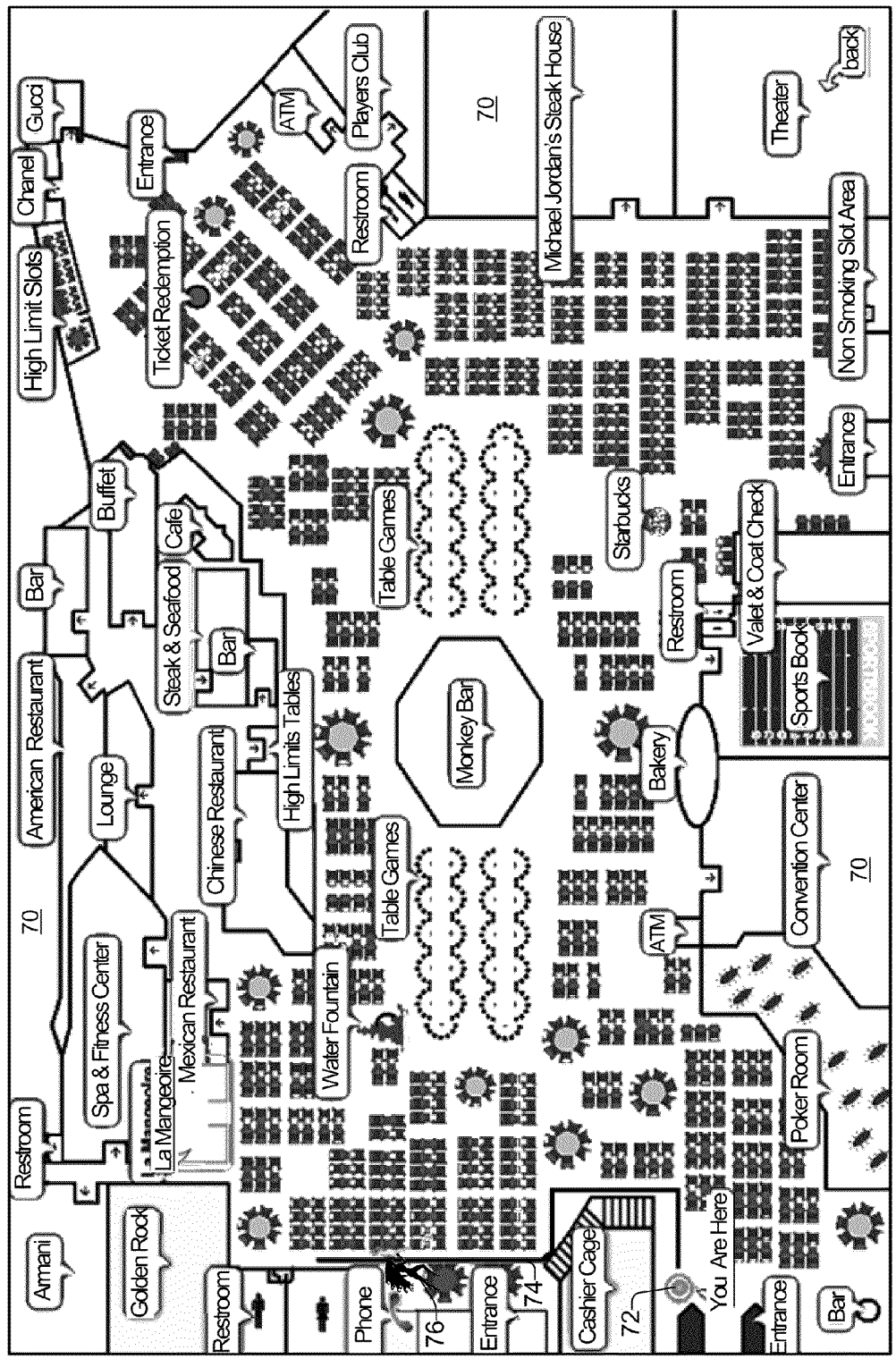
FIG. 14 is a drawing showing an exemplary route to a restaurant, in accordance with the embodiment shown in FIG. 11.

FIG. 14 is a drawing showing an exemplary route 74 to a restaurant, in accordance with the embodiment shown in FIG. 11. In this example, a route 74 to the La Mangeoire restaurant is plotted on a floor map 70. The operation here is similar to mapping routes 74 to slot machines 78 shown in FIGS. 6A-6D and 7A-7C. In this example, the route 74 is not yet complete to the restaurant, and a phone is being animated 75 as the avatar 76 runs by a phone on the map 70. The name of the restaurant on the map is highlighted, similar to how the names of banks of slot machines were highlighted in those previous mapping FIGs.

Figure 15:
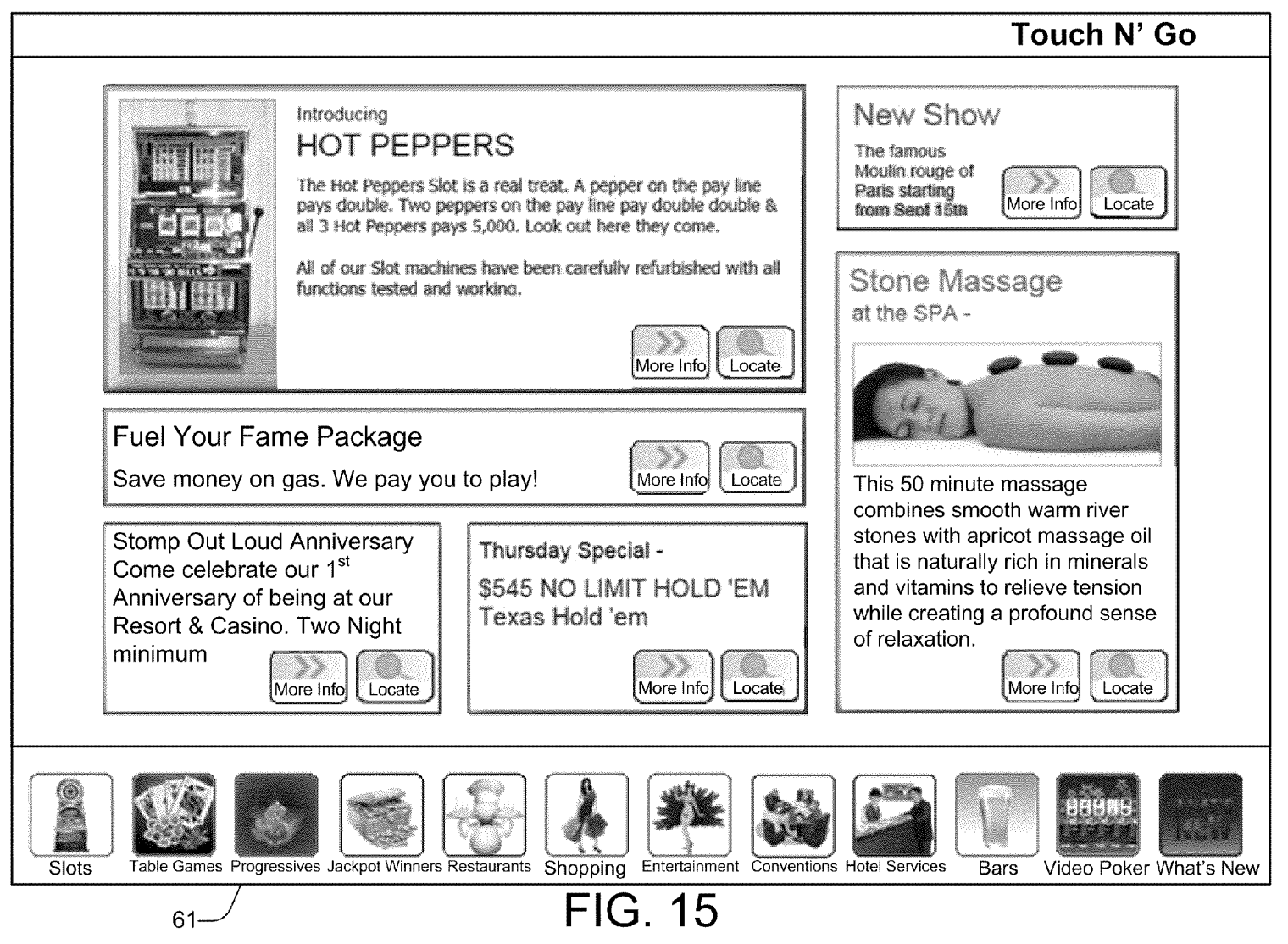

FIG. 15 is drawing showing an exemplary What's New screen, in accordance with one embodiment of the present invention. This screen is presented when a "What's New" navigational key or button 62, 63 is pushed. The screen is broken up into sections, with each section containing information for some event, attraction, etc. In this embodiment, each section has a "More Info" button and a "Locate" button. More information is presented for that event, attraction, etc., when the "More Info" button is pressed. A route 74 is drawn on a map 70 to the event, attraction, etc. when the "Locate" button is pressed, similar in operation to the operation shown in FIGS. 6A-6D and 7A-7C for locating slot machines. A row 61 of small high level location keys or buttons 63 is located on the bottom of the screen.

Figure 16:
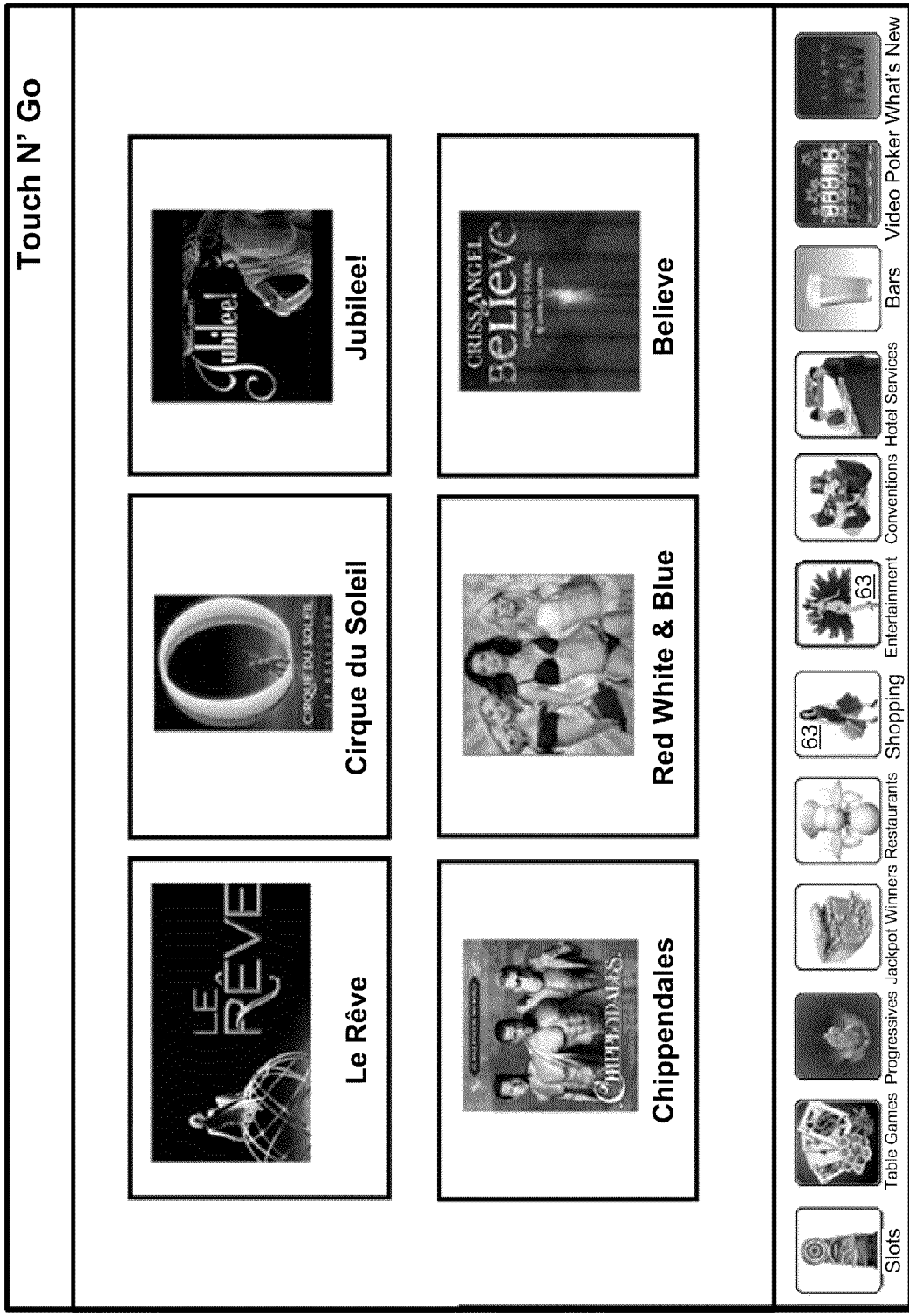
FIG. 16 is drawing showing an exemplary Entertainment screen, in accordance with one embodiment of the present invention.

FIG. 16 is drawing showing an exemplary Entertainment screen, in accordance with one embodiment of the present invention. This screen is presented when an "Entertainment" navigational key or button 62, 63 is pushed. The screen contains a plurality of buttons corresponding to different entertainment options. In this example, six buttons are shown for six different shows: Le Reve; Cirque du Soleil; Jubilee; Chippendales; Red White & Blue; and Believe. In one embodiment, when a user presses one of these buttons, another screen (Not Shown) is displayed providing more information about that entertainment option. This information may include a more detailed description of the entertainment option, hours of operation, a phone number for reservations, and possibly a short video of that entertainment option. The user is then given the choice to have the system generate a route 74 to that attraction 78 by pressing a "Locate" button. The user may also be given an option to get reservations to that entertainment option at that time. This may include a coupon for the entertainment or some other attraction. In another embodiment, the route 74 is generated and displayed on a map 70 when the button is pressed. A row 61 of small high level location keys or buttons 63 is located on the bottom of the screen.

Figure 17:
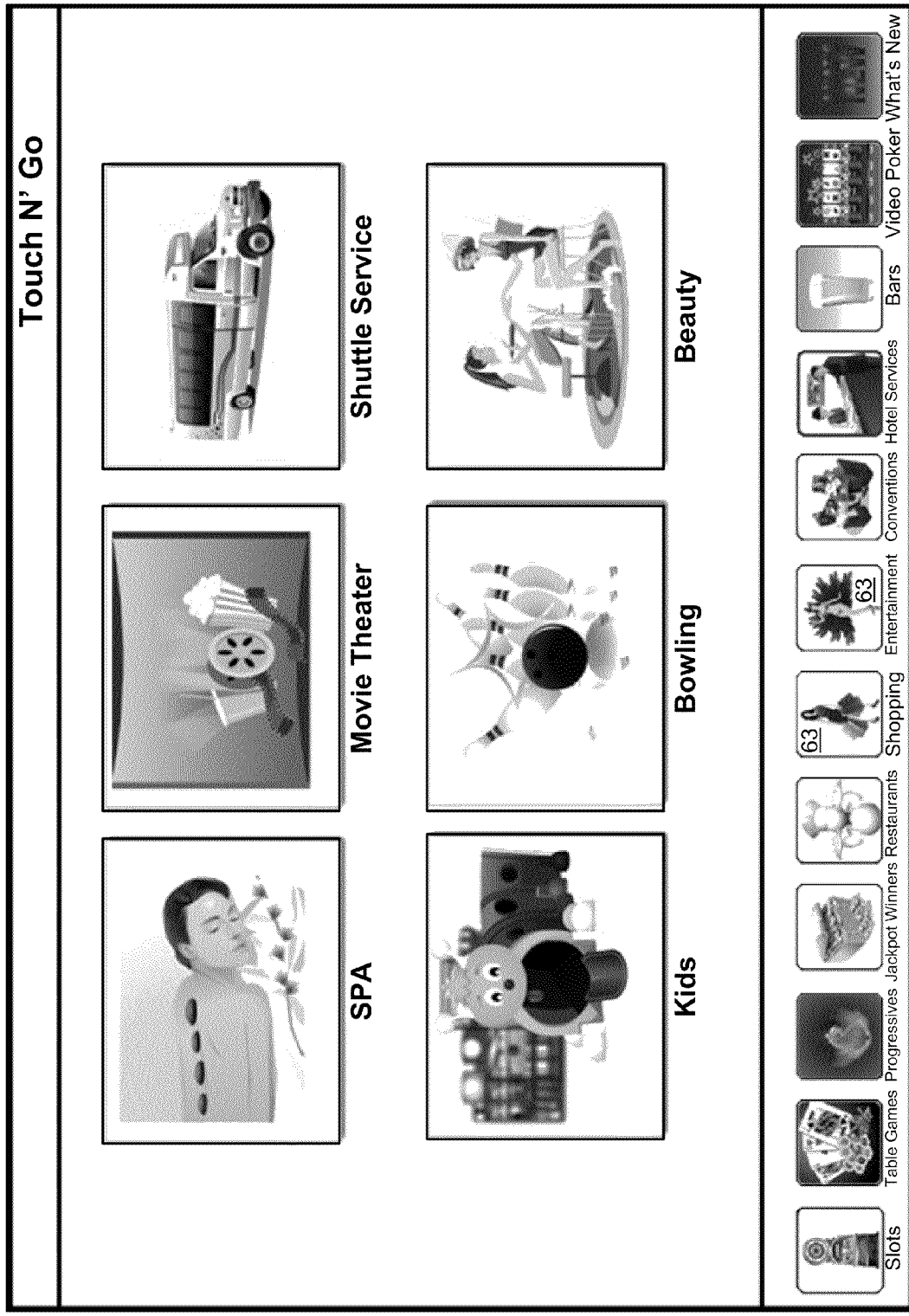
FIG. 17 is drawing showing an exemplary Hotel Services screen, in accordance with one embodiment of the present invention.

FIG. 17 is a drawing showing an exemplary Hotel Services screen, in accordance with one embodiment of the present invention. This screen is presented when a "Hotel Services" navigational key or button 62, 63 is pushed. This screen is similar to that for Entertainment shown in FIG. 16, except that hotel services are provided. In this example, buttons are displayed for: Spa; Movie Theater; Shuttle Service; Kids; Bowling; and Beauty.

FIG. 18 is drawing showing an exemplary Meetings screen, in accordance with one embodiment of the present invention. This screen is presented when a "Meetings" navigational key or button 62, 63 is pushed. In this embodiment, information for meetings in six meeting rooms is displayed. For each meeting, the name of the room is listed first, and then a description of what meeting is scheduled for that room is below the room name. On the right side of each room entry is a "Locate" button that results in a route 74 on a map 70 being generated to the selected meeting room 78. A row 61 of small high level location keys or buttons 63 is located on the bottom of the screen.

Figure 19:
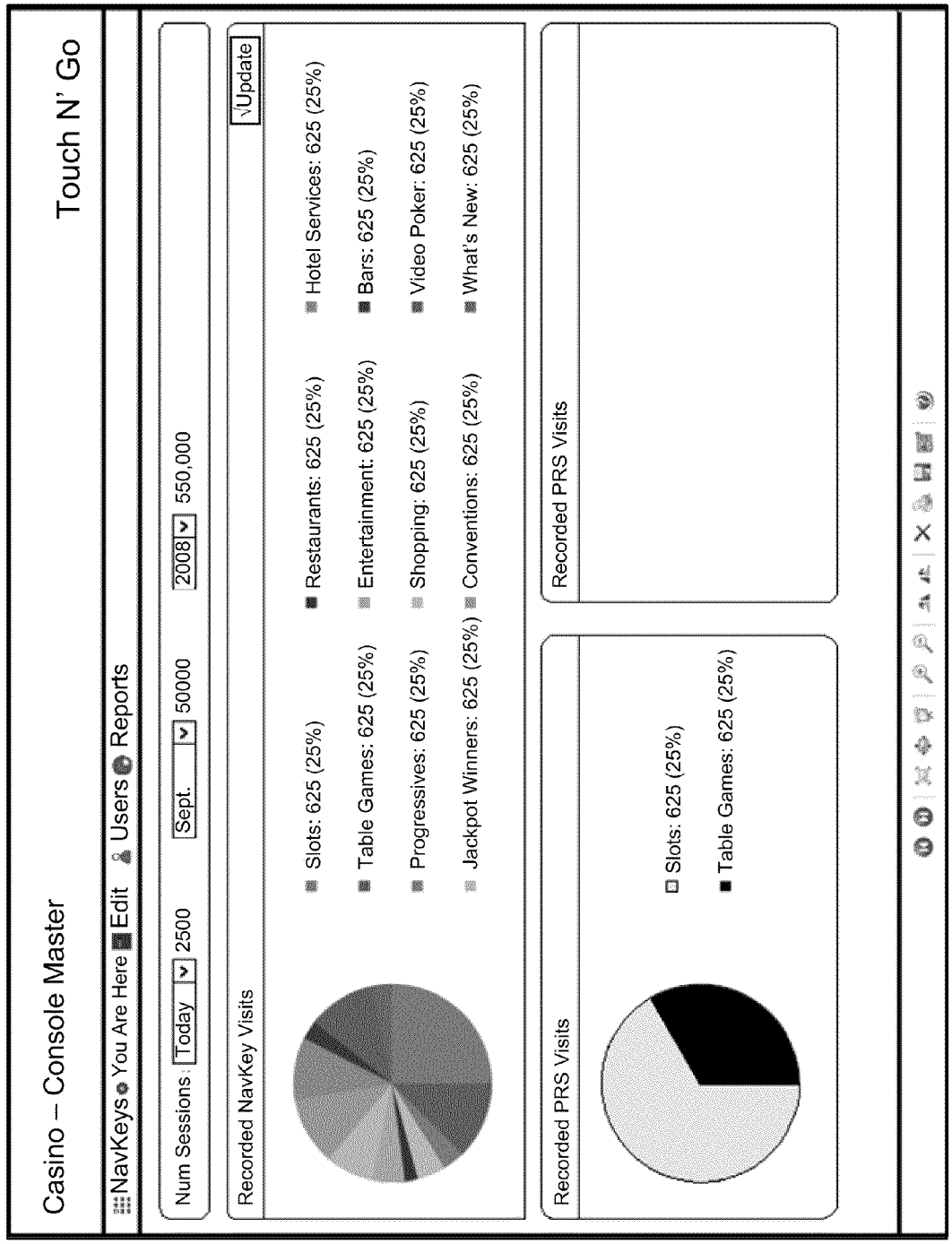
FIG. 19 is a drawing showing an exemplary Console Master statistics screen, in accordance with one embodiment of the present invention.

FIG. 19 is a drawing showing an exemplary Console Master statistics screen, in accordance with one embodiment of the present invention. The Console Master screens are provided in order to control operation of the system implementing the present invention. Various statistics are presented on this Console Master Statistics screen, such as the breakdown of how many users used which navigational keys 62, 63. In one embodiment of the present invention, the statistics can be generated for various periods, ranging from the current day, or even shorter periods, through longer periods, such as months. In one embodiment, administrators may be able to use this screen to drill down to determine, for example, what slot machines were being sought.

Figure 20:
FIG. 20 is a drawing showing an exemplary Console Master navigation key assignment screen, in accordance with one embodiment of the present invention.

FIG. 20 is a drawing showing an exemplary Console Master navigation key assignment screen, in accordance with one embodiment of the present invention. This screen allows an administrator to assign the various navigation keys or buttons 62, 63, displayed on the initial navigation screen 60 and in a row 61 on the bottom of navigation screens.

Figure 21:
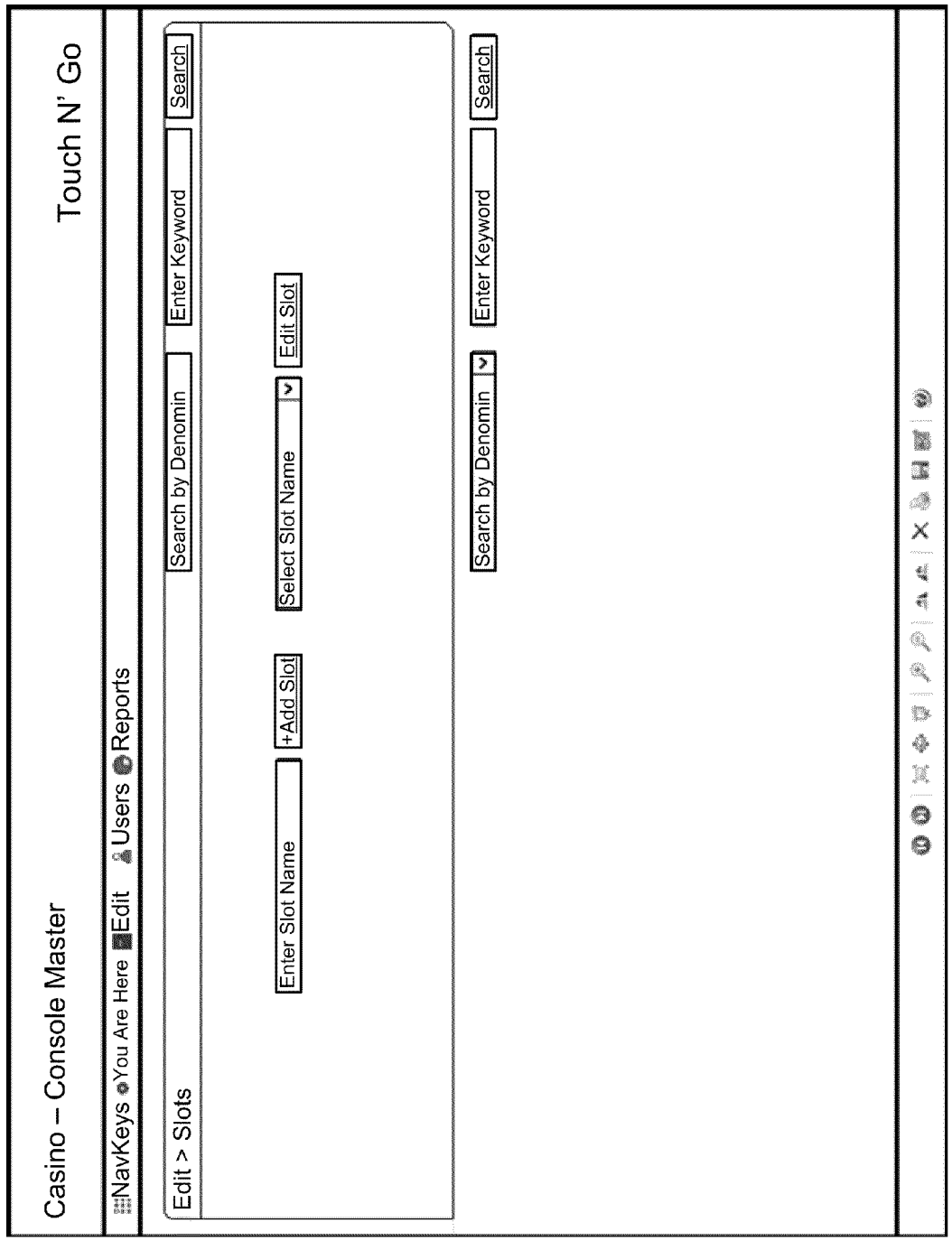
FIG. 21 is a drawing showing an exemplary Console Master slot machine navigation key assignment screen, in accordance with one embodiment of the present invention.

FIG. 21 is a drawing showing an exemplary Console Master slot machine navigation key assignment screen, in accordance with one embodiment of the present invention. This screen allows an administrator to describe slot machines, including their denomination, and also to potentially populate the navigation buttons or keys 86 on the Search by Name Slot Machine navigation page 81 shown in FIG. 5. A similar Console Master screen is provided for table games.

Figure 22:
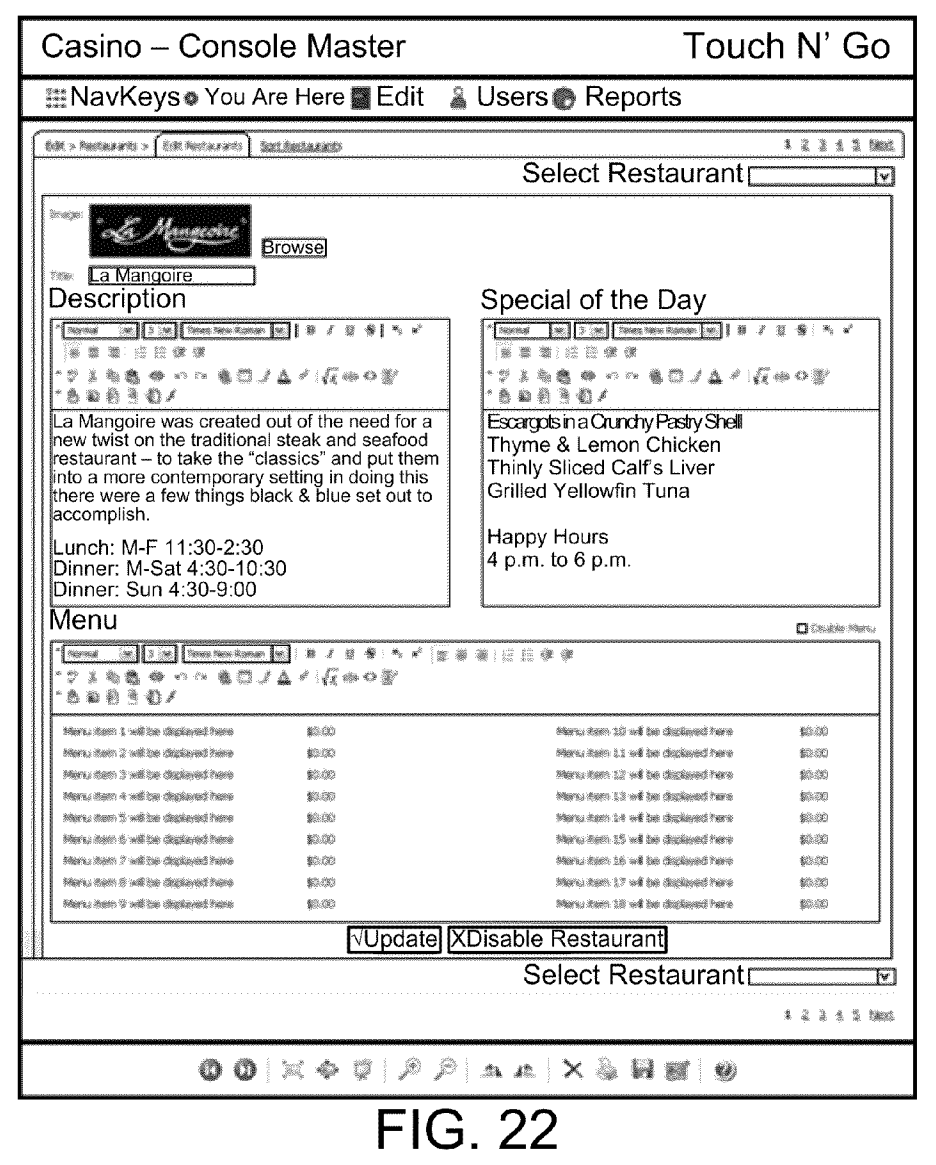

FIG. 22 is a drawing showing an exemplary Console Master restaurant description screen, in accordance with one embodiment of the present invention. An administrator can utilize this screen to provide information for a restaurant or bar, as displayed in FIGS. 11, 12, and 13.

Figure 23:
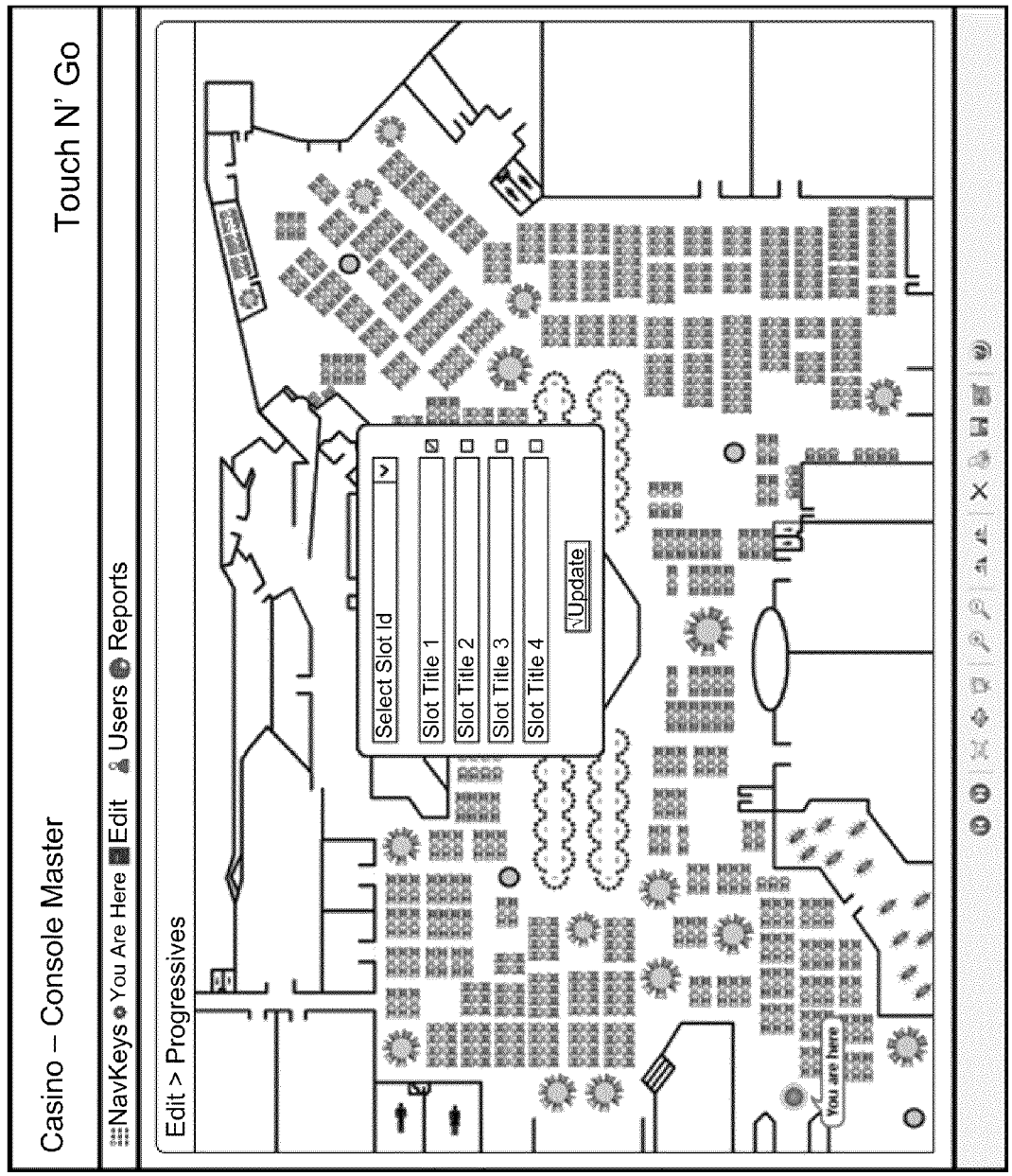
FIG. 23 is a drawing showing an exemplary Console Master slot machine location map screen, in accordance with one embodiment of the present invention.

FIG. 23 is a drawing showing an exemplary Console Master slot machine location map screen, in accordance with one embodiment of the present invention. An administrator can utilize this screen to locate banks of slot machines on the floor map 70. This information can then be used to generate routes 74 to the banks of slot machines 78. Similar functionality is provided for locating other features and attractions on the floor map 70, such as table games, restaurants, meetings, entertainment options, hotel services, etc.

Figure 24:
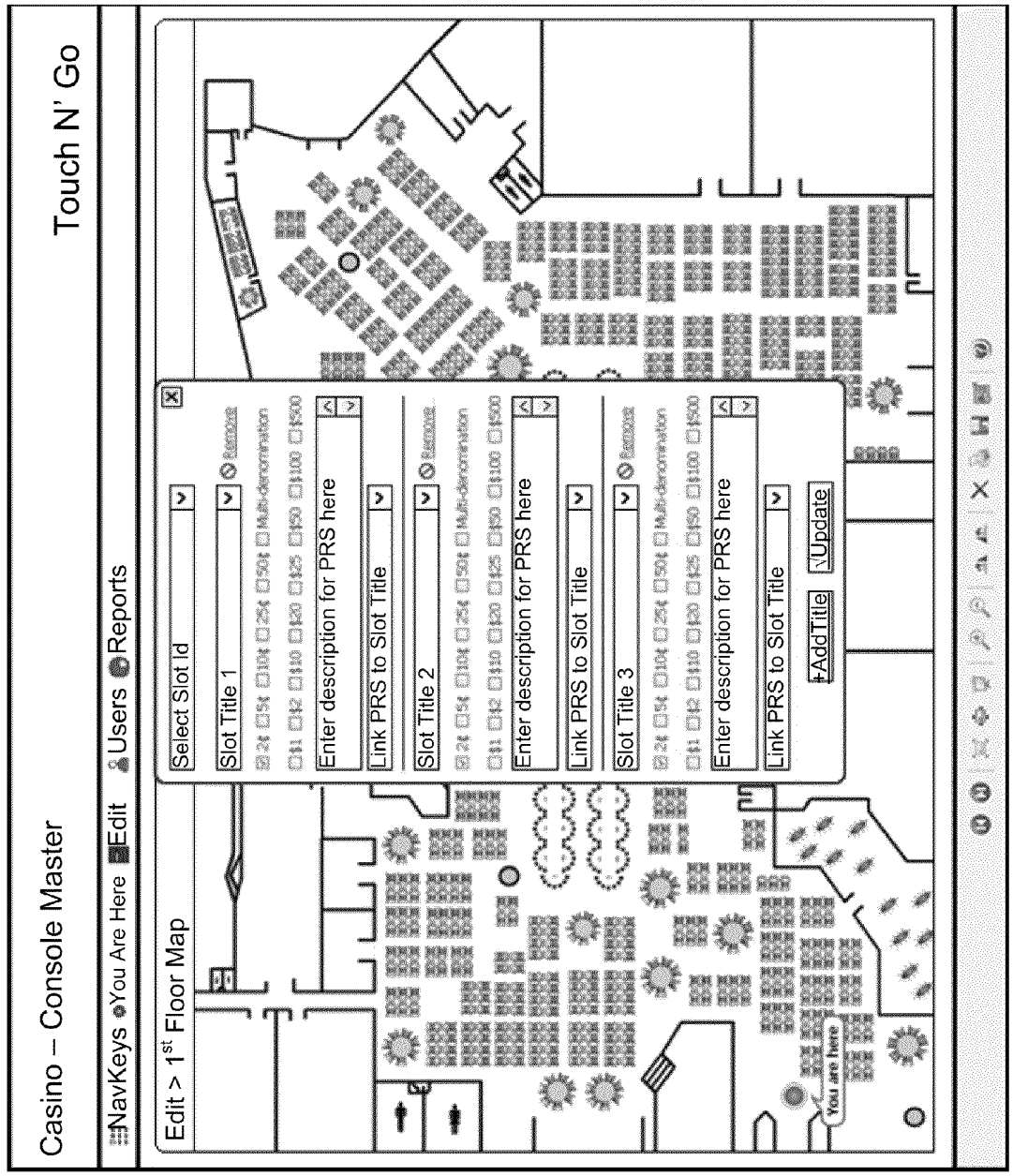
FIG. 24 is a drawing showing an exemplary Console Master denominational slot machine location map screen, in accordance with one embodiment of the present invention.

FIG. 24 is a drawing showing an exemplary Console Master denominational slot machine location map screen, in accordance with one embodiment of the present invention. The administrator can check each denomination that a slot machine, or bank of slot machines, will allow. In one embodiment of the present invention, these menus are stand-alone, with the administrator identifying slot machines by denomination, regardless of game played. In another embodiment, this menu can be called or invoked from the slot machine identification menu entries shown in FIG. 23 for specific slot machine games or banks of slot machines.

Figure 25:
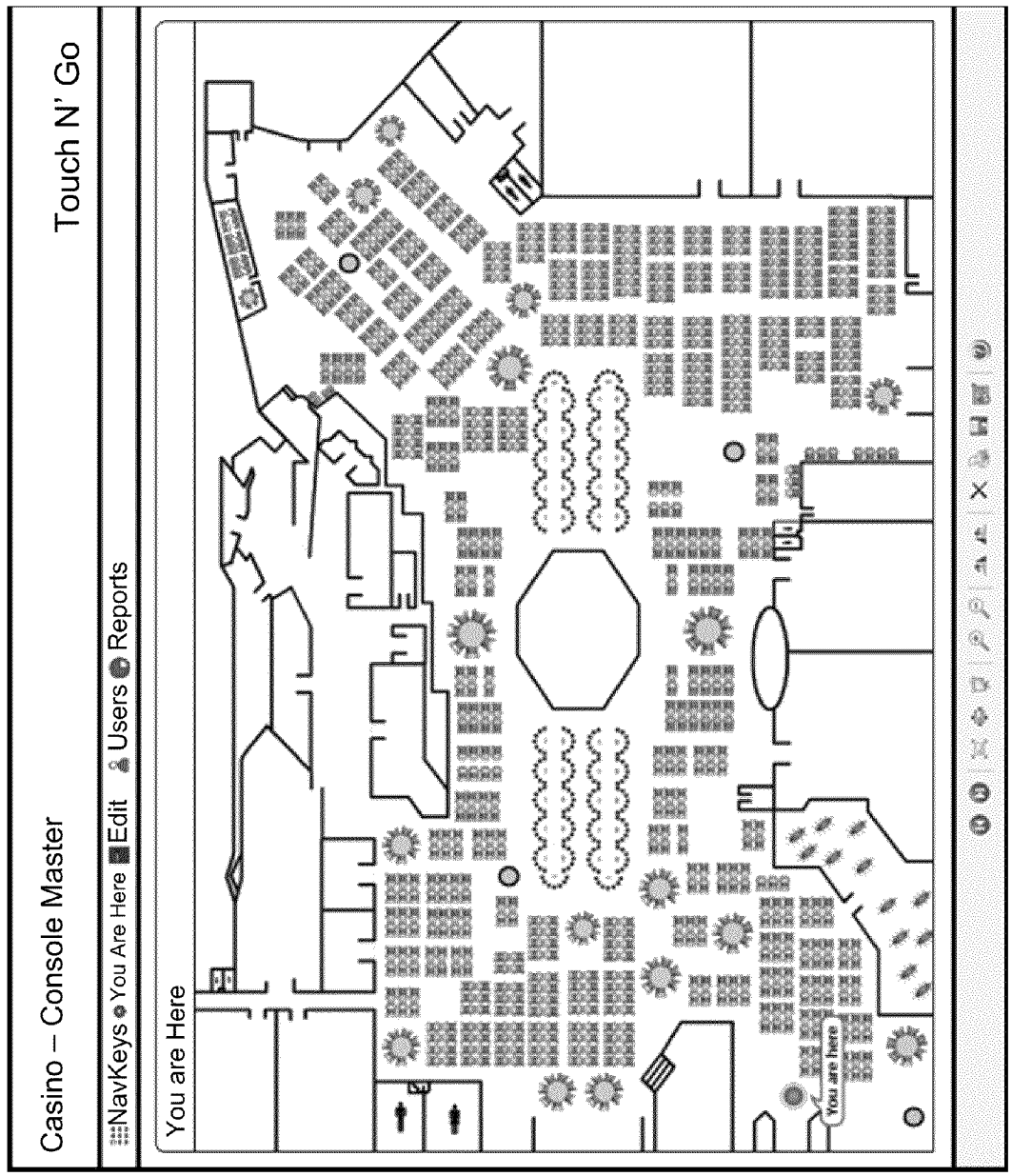
FIG. 25 is a drawing showing an exemplary Console Master You Are Here location map screen, in accordance with one embodiment of the present invention.

FIG. 25 is a drawing showing an exemplary Console Master "You Are Here" location map screen, in accordance with one embodiment of the present invention. This allows an administrator to specify the initial "You are Here" location 72 for a given device, such as a touch screen device 52. It should be understood that in a large venue, such as a large casino, there are preferably a plurality of these location devices 52 installed, for example, by each main entrance and throughout the casino floor. Each of these will typically have its own "You are Here" initial routing location 72 set by this screen.

FIG. 26 is a drawing showing an exemplary Console Master Jackpot Winners screen, in accordance with one embodiment of the present invention. This screen allows an administrator to set up the entries for the Jackpot Winners screen described in FIG. 9. Each winner entry will typically contain a picture of the winner, his or her name, and some information about the jackpot such as which game was won and how much was paid. Preferably, administrators will keep these entries current, replacing those with smaller or earlier jackpots with information about larger and/or newer jackpot winners.

Figure 27:
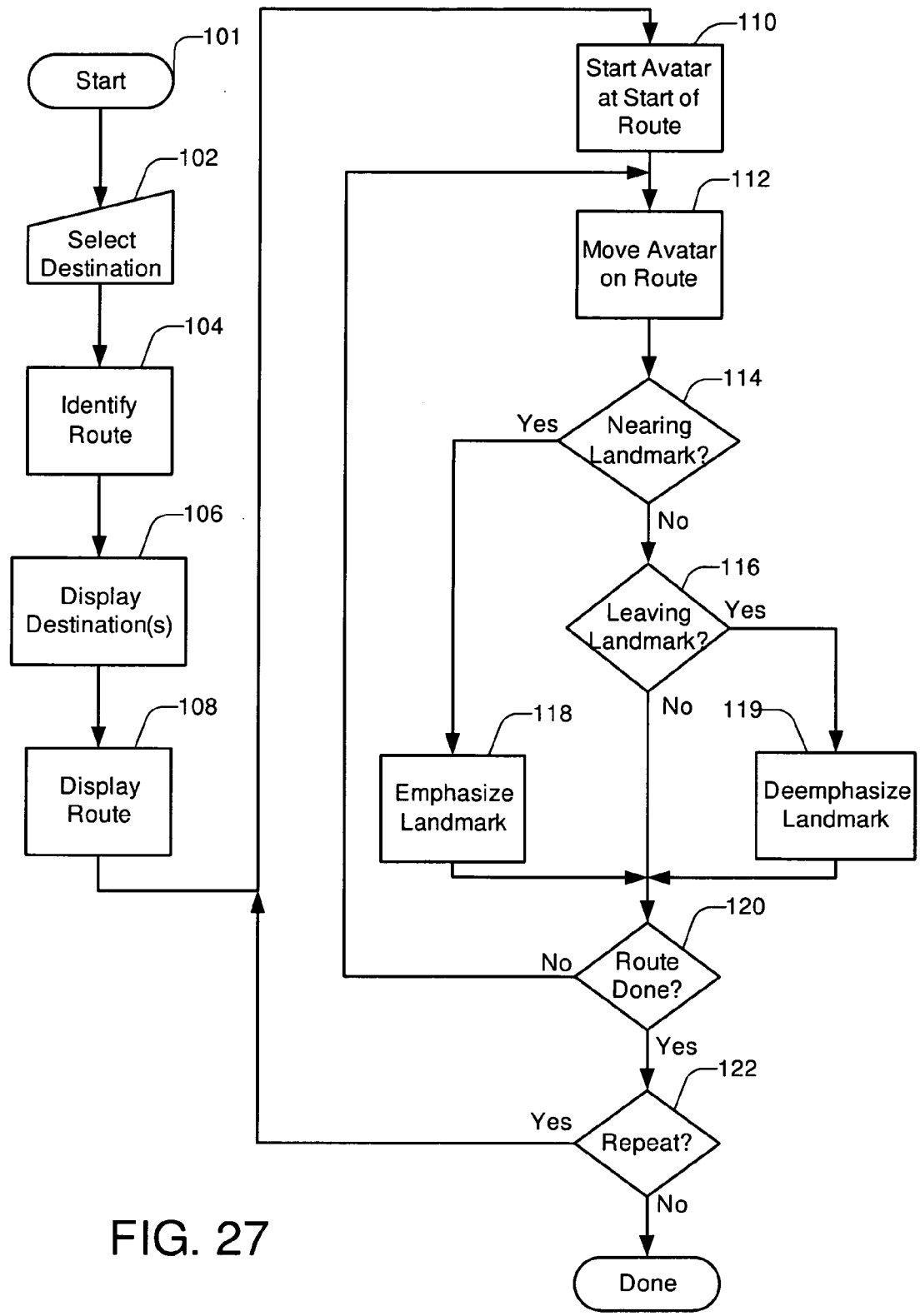
FIG. 27 is a flowchart illustrating operation of providing a route on a map, in accordance with one embodiment of the present invention

FIG. 27 is a flowchart illustrating operation of providing a route on a map, in accordance with one embodiment of the present invention. The method starts, step 101, by selecting a destination 78, step 102 to which to draw the route 74. FIGS. 4, 5, 8, 10-13, 15-18 provide mechanisms for selecting a destination 78, typically by selecting or pressing a button or key on a screen. The route 74 is identified, step 104. In one embodiment of the present invention, the route 74 is selected based on a combination of shortest path plus number of landmarks 75. The selected destination 78 or destinations are displayed on the map 70, step 106. Multiple destinations may be displayed when the search criteria utilized to select a destination result in multiple destinations, such as when there are multiple banks of the selected slot machine game (see FIGS. 6A-6D and 7A-7C). The route 74 is displayed on the map 70, step 108. In one embodiment, it is drawn on the map as the avatar 76 moves along the route 74 the first time.

An outer loop is then entered. The avatar 76 is started at the start 72 of the route 74, step 110. This may be a "You are Here" location. The avatar 76 then moves along the route 74, step 112. Whenever the avatar 76 approaches a landmark 75, step 114, the landmark 75 is emphasized, step 118, and whenever the avatar leaves or progresses away from a landmark 75, step 116, the landmark 75 is deemphasized on the map 70, step 119. The emphasis may take the form of making the landmark 75 larger. Another alternative is to animate the landmark 75. Other methods of emphasizing and deemphasizing are also within the scope of the present invention. This repeats until the avatar 76 reaches the destination 78 on the route 74 on the map 70, step 120. A test is made whether to repeat the avatar 76 moving along the route 74, step 122, and if the repeat count (or other termination condition) has not expired, the outer loop is repeated, starting with starting the avatar 76 at the start 72 of the route 74, step 110.

Figure 28:
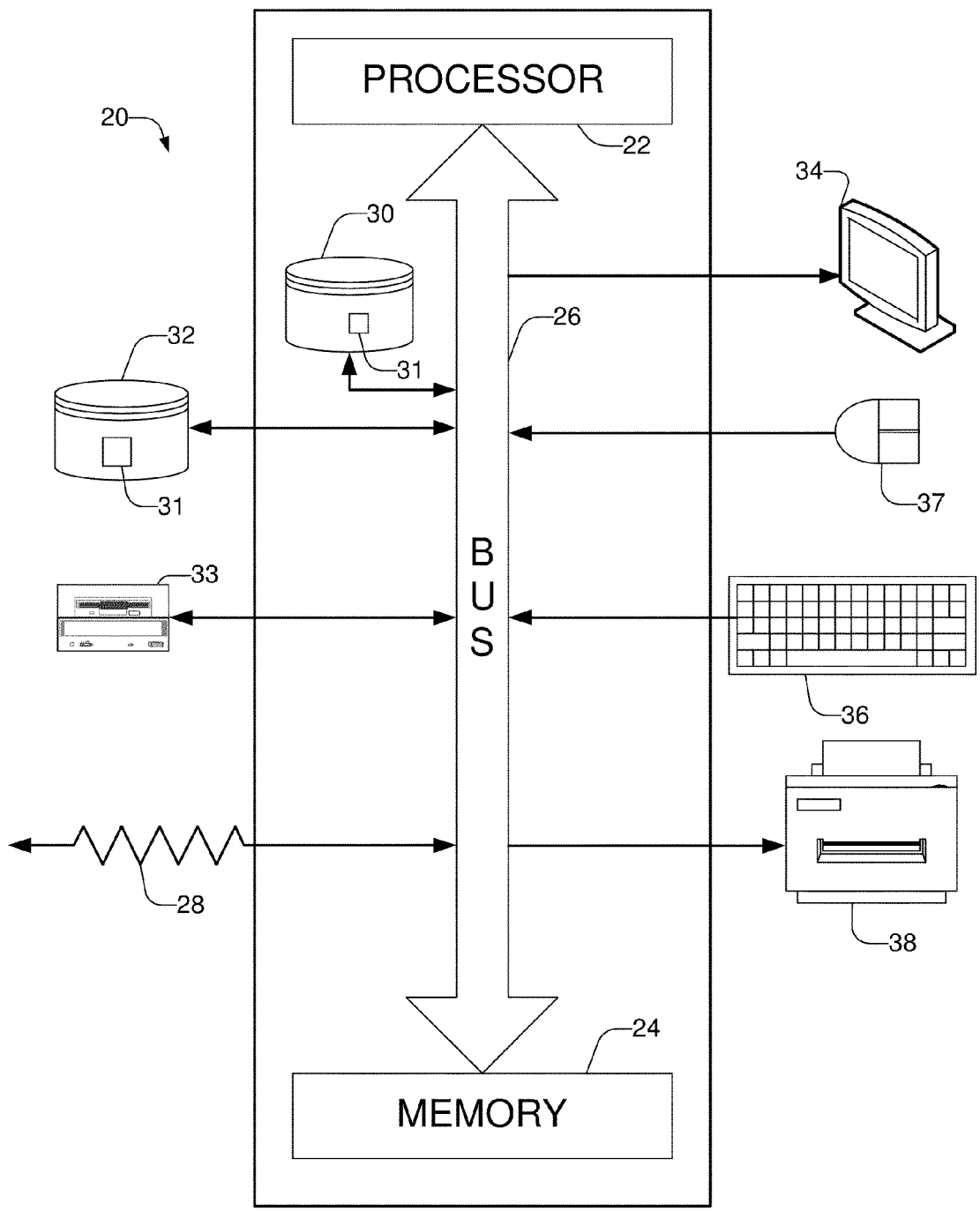
FIG. 28 is a block diagram illustrating a General Purpose Computer.

FIG. 28 is a block diagram illustrating a General Purpose Computer, such as utilized for the servers 50, 51, laptop 56, and personal computers 58 shown in FIG. 1 The General Purpose Computer 20 has a Computer Processor 22 (CPU), and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such operating systems, utilities, user programs, and software to implement the present invention can be stored in a Computer Software Storage Medium, such as memory 24, Secondary Storage 30, and External Storage 32. Executable versions of computer software 33, such as software utilized to implement the present invention can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

There are numerous ways that a provider of the services of the present invention may generate income. A PRS for promoting different attractions or facilities (such as slot or video games) was disclosed above. Also, different games may be promoted on an initial featured slot navigation screen (see FIG. 5B above). Another alternative is to promote such on the Search by Name navigation screen (see FIG. 5A above) by listing promoted games ahead of other games on that page. A one time fee may be charged. A prime time fee may also be charged for these types of promotions. A fee per click may also be charged to the vendors providing games, similar to how search engines charge for advertising. The vendors would be charged for every time that a user used the present invention to draw a map to one of the vendors' attractions. Other types of advertising and promotions are also within the scope of the present invention.

Some of the additional features and advantages provided by the present invention:
  Map on mobile : Users can get a route to their destination on their mobile phone with the help of Bluetooth/Infrared.
  Get SMS: Get SMS alerts for new introductions. A unique website associated to the present invention can alert users when a new game, shop, restaurant, bar or a new jackpot winner is introduced on the floor.
  Audio Effect: Users can listen to great audio while they find their favorite gaming machine. They can select songs from a vast library, even purchase and download to their smart phones from a library, such as iTunes.
  Multi-touch: Drag and drop Screens for Multi-touch. This allows multiple operations at a same time. Users can also send details of features which they like by email to their friends.

Print out map: Print out the map on double sided coupon. Coupons may be printed for landmarks 75 visited on a route 74 printed on the map 70.

Print out coupons: Coupon for free slot play. Coupon from the present invention can be inserted directly into a slot machine or table game for promotion play. Player's card gets authenticated for ticket. Coupons can also be provided for discount merchandise, entertainment, and for restaurant specials.

Voice search: The present invention can provide voice recognition for providing most, if not all, of the functionality shown above.

Leave a Feedback: Users can leave feedback and rate features of the Casino

Lost & Found: If users lose anything, they can just enter their details as well as the information about the thing they have lost. When the Casino finds it, they will inform the user in their requested medium, such as on their mobile phone, via email, SMS text message, etc.

Buy Tickets: Users can purchase tickets for a show they like through usage of the present invention. The just select the show and the time and enter their credit card details and print their tickets. The present invention could also remind them about the show in time intervals via SMS, automated telephone calls, email, etc. They may also be able to print discount coupons and show schedules.

Language option: Users may be provided the ability to select their preferred language.

Book a table: The present invention may allow users to book a table in a restaurant. They may also be allowed to select their menu Dishes for faster service and specify meal taste preferences.

Transfer videos: Users may be able to buy videos of shows or memorabilia.

Browse a website: Users may be able to browse any website and/or surf the Internet.

Blog: You can also write a blog on iGuide.

Download casino applications: Users may be able to download an application onto their mobile devices which could act as a casino guide. This application may be active for a limited period of time. Users could buy subscriptions to multiple Casinos all over the world and when they visit the Casino, they would be able to download the property details on their mobile device, laptop, smart phone, etc.

View The Casino on the Internet: Users can store their plan for their visit and book shows, restaurants and special services.

Players Club: Users may be able to view the full services and options available to them.

Promotional Games: Users may be able to play free promotional games at iGuide sponsored by either the casino, participating retailers, and other entities. The promotional games can tie in with bonus coupon awards. Example free play games could include Wheel of Fortune promo spin, Scratch Card, Slingo, eBay, Nordstrom, Blazing 7's, TGI Friday, etc.

Those skilled in the art will recognize that modifications and variations can be made without departing from the spirit of the invention. Therefore, it is intended that this invention encompass all such variations and modifications as fall within the scope of the appended claims.

What is claimed is:

1. A method of providing navigation through a property comprising:
   accepting a selection of a destination within the property as a selected destination;
   generating a route between a starting location and the selected destination, wherein the route travels by a plurality of landmarks within the property;
   providing a display in which an avatar is moved along the route within the property from the starting location to the selected destination; and
   increasing within the display the size of at least one of the plurality of landmarks within the property as the avatar moves within the display by the corresponding landmark.

2. The method in claim 1 which further comprises:
   repeating the moving the avatar along the route from the starting location to the selected destination and emphasizing each of the plurality of landmarks as the avatar moves by the corresponding landmark.

3. The method in claim 1 further comprising
   animating the at least one of the plurality landmarks within the property as the avatar moves within the display by the corresponding landmark.

4. The method in claim 1 which further comprises:
   accepting a selection of a game as a selected game; and
   selecting a set of games providing the selected game as the selected destination.

5. The method in claim 4 which further comprises:
   accepting a choice of another set of games providing the selected game as the selected destination.

6. The method in claim 4 wherein:
   the selected game is a gaming machine game; and
   the set of games is a bank of gaming machines.

7. The method in claim 4 wherein:
   the selected game is a table game.

8. The method in claim 4 wherein:
   the selection of the game includes a selection by a denomination of the wagering of the game.

9. The method in claim 4 wherein:
   the selection of the game includes a selection by a name of the game.

10. A system for providing navigation through a property comprising:
    a means of executing computer instructions;
    a means for storing computer instructions, said means for storing computer instructions comprising a set of computer instructions for:
       accepting a selection of a destination within the property as a selected destination;
       generating a route between a starting location and the selected destination, wherein the route travels by a plurality of landmarks within the property;
       providing a display in which an avatar is moved along the route within the property from the starting location to the selected destination; and
       increasing within the display the size of at least one of the plurality of landmarks within the property as the avatar moves within the display by the corresponding landmark;
    a means for displaying the route; and
    a means for accepting the selection of the destination as the selected destination.

11. The system in claim 10 wherein the set of computer instructions further comprises computer instructions for:
    repeating the moving the avatar along the route from the starting location to the selected destination and emphasizing each of the plurality of landmarks as the avatar moves by the corresponding landmark.

12. The system in claim 10 further comprising:
animating the at least one of the plurality landmarks within the property as the avatar moves within the display by the corresponding landmark.

13. The system in claim 10 wherein the set of computer instructions further comprises computer instructions for:
accepting a selection of a game as a selected game;
selecting a set of games providing the selected game as the selected destination.

14. The system in claim 13 wherein the set of computer instructions further comprises computer instructions for:
accepting a choice of another set of games providing the selected game as the selected destination.

15. The system in claim 13 wherein:
the selection of the game includes a selection by a denomination of the wagering of the game.

16. The system in claim 13 wherein:
the selection of the game includes a selection by a name of the game.

17. The system in claim 10 wherein:
the means for displaying the route and the means for accepting the selection are a touch screen device.

18. The system in claim 10 wherein:
the means for displaying the route is a mobile device.

19. A non-transitory computer readable medium containing a set of computer instructions executable by a processor for providing navigation through a property, said set of computer instructions comprising computer instructions for:
accepting a selection of a destination within the property as a selected destination;
generating a route between a starting location and the selected destination, wherein the route travels by a plurality of landmarks within the property;
providing a display in which an avatar is moved along the route within the property from the starting location to the selected destination; and
increasing within the display the size of at least one of the plurality of landmarks within the property as the avatar moves within the display by the corresponding landmark.

* * * * *